US008299890B2

(12) United States Patent
Nagasawa

(10) Patent No.: US 8,299,890 B2
(45) Date of Patent: Oct. 30, 2012

(54) SYSTEM AND METHOD FOR POWER MANAGEMENT DIRECTED TO IMAGE FORMING APPARATUS, AND USAGE MANAGEMENT APPARATUS OF IMAGE FORMING APPARATUS

(75) Inventor: Kenichi Nagasawa, Takatsuki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 948 days.

(21) Appl. No.: 12/180,672

(22) Filed: Jul. 28, 2008

(65) Prior Publication Data
US 2009/0040017 A1 Feb. 12, 2009

(30) Foreign Application Priority Data
Aug. 10, 2007 (JP) ................................ 2007-209335

(51) Int. Cl.
*G05B 19/00* (2006.01)
*G06Q 20/00* (2006.01)
*G06F 1/26* (2006.01)
*G06F 3/12* (2006.01)
*G06K 15/00* (2006.01)
(52) U.S. Cl. ............ 340/5.2; 340/5.74; 705/67; 705/72; 713/320; 358/1.14; 358/1.15
(58) Field of Classification Search .......... 340/5.2–5.74; 705/5; 713/202, 320; 358/1.15, 1.14
See application file for complete search history.

(56) References Cited

U.S. PATENT DOCUMENTS

| 5,959,530 | A | * | 9/1999 | Lupien et al. ............... 340/568.1 |
| 2002/0054330 | A1 | * | 5/2002 | Jinbo et al. .................... 358/1.15 |
| 2007/0078782 | A1 | * | 4/2007 | Ono et al. ........................ 705/67 |
| 2008/0104668 | A1 | * | 5/2008 | Fujikawa .......................... 726/2 |
| 2009/0031397 | A1 | * | 1/2009 | Chikada ............................ 726/2 |
| 2009/0058594 | A1 | * | 3/2009 | Nakagawa et al. ............. 340/5.7 |

FOREIGN PATENT DOCUMENTS

| JP | 02-090181 | 3/1990 |
| JP | 10-208173 A | 8/1998 |
| JP | 2002-281190 | 9/2002 |
| JP | 2003-008792 | 1/2003 |
| JP | 2004-038381 A | 2/2004 |
| JP | 2007-102382 | 4/2007 |

OTHER PUBLICATIONS

Notice of Grounds of Rejection in JP 2007-209335 dated Jul. 21, 2009, and an English Translation thereof.

* cited by examiner

*Primary Examiner* — Brian Zimmerman
*Assistant Examiner* — Omeed Alizada
(74) *Attorney, Agent, or Firm* — Buchanan Ingersoll & Rooney PC

(57) ABSTRACT

A presence state inquiry unit refers to a use permission table stored in a data storage unit to extract a user permitted to use a target image forming apparatus, and inquires from an entry control server for a presence state of the extracted user in a particular area where the target image forming apparatus is placed. A mode transition unit transmits a transition command to a lower power consumption mode to the target image forming apparatus when all the users permitted to use the target image forming apparatus exist outside the particular area.

13 Claims, 14 Drawing Sheets

| USER ID | USER NAME | DOOR 10 | DOOR 20 |
|---|---|---|---|
| ID:000001 | USER A | PERMITTED | PERMITTED |
| ID:000002 | USER B | PERMITTED | PERMITTED |
| ID:000003 | USER C | NOT PERMITTED | PERMITTED |
| ID:000004 | USER D | NOT PERMITTED | PERMITTED |
| ... | ... | ... | ... |

| USER ID | USER NAME | AREA1 | AREA2 |
|---|---|---|---|
| ID:000001 | USER A | OUT(OUT OF THE ROOM) | OUT |
| ID:000002 | USER B | IN(IN THE ROOM) | OUT |
| ID:000003 | USER C | OUT | OUT |
| ID:000004 | USER D | OUT | IN |
| ... | ... | ... | ... |

356a

| USER ID | MFP1 | MFP2 | MFP3 | MFP4 |
|---|---|---|---|---|
| ID : 000001 | PERMITTED | PERMITTED | NOT PERMITTED | NOT PERMITTED |
| ID : 000002 | NOT PERMITTED | NOT PERMITTED | PERMITTED | PERMITTED |
| ID : 000003 | PERMITTED | NOT PERMITTED | NOT PERMITTED | NOT PERMITTED |
| ID : 000004 | PERMITTED | NOT PERMITTED | NOT PERMITTED | NOT PERMITTED |
| ... | ... | ... | ... | ... |

| MODEL ID | LOCATION AREA |
|---|---|
| MFP1 | AREA1 |
| MFP2 | AREA1 |
| MFP3 | AREA2 |
| MFP4 | AREA2 |
| ... | ... |

SYSTEM AND METHOD FOR POWER MANAGEMENT DIRECTED TO IMAGE FORMING APPARATUS, AND USAGE MANAGEMENT APPARATUS OF IMAGE FORMING APPARATUS

This application is based on Japanese Patent Application No. 2007-209335 filed with the Japan Patent Office on Aug. 10, 2007, the entire content of which is hereby incorporated by reference.

BACKGROUND OF THE INVENTION

1. Field of the Invention

The present invention relates to a system and a method for power management, directed to an image forming apparatus, and a usage management apparatus of the image forming apparatus, particularly to a technique of managing a power supply in cooperation with an entry control apparatus for controlling user's access to a particular area.

2. Description of the Related Art

Recently, efforts to reduce power consumption are made for many electric products as concern for environmental issues is being grown. The efforts also involve business machines typified by copying machines. For example, Japanese Laid-Open Patent Publication No 2004-038381 discloses a power supply apparatus including means for detecting a state of use of a main information processing apparatus among a plurality of information processing apparatuses connected to a power supply apparatus, and means for supplying alternating current power to the information processing apparatuses connected to the power supply apparatus in the case where the main information processing apparatus is in the use state while stopping supply of the alternating current power to the information processing apparatuses connected to the power supply apparatus in the case where the main information processing apparatus is in the nonuse state.

With the recent development in the information communication technology, an entry control system in which an IC (Integrated Circuit) card or the like is used has become popular. There has been proposed a technique of utilizing such an entry control system to reduce the power consumption of the business machines. For example, Japanese Laid-Open Patent Publication No. 10-208173 discloses an entry control system including display means for displaying a warning in a caretaker's room when a value exceeding a predetermined electricity usage amount is detected while a tenant is absent in a room.

Sometimes only a particular user is permitted to use business machines such as an image forming apparatus depending on scope of business in an office. For example, in a usage manner, only a user who is given a certain responsibility is permitted to use the image forming apparatus. In such usage manner, after the user permitted to use the image forming apparatus goes home, the image forming apparatus is not used even if other users exist in the office. Therefore, in such a situation, it is preferable to set the image forming apparatus in a standby mode or to turn off the image forming apparatus.

However, in Japanese Laid-Open Patent Publication No. 10-208173, only the electricity usage amount is managed in the case where all the tenants leave the rooms, and the electricity usage amount is not managed for each business machine.

SUMMARY OF THE INVENTION

In view of the foregoing, an object of the present invention is to provide a system and a method for power management capable of properly managing power supply depending on existence of a user who is expected to use the image forming apparatus, and a usage management apparatus of the image forming apparatus.

A power management system according to a first aspect of the present invention includes: an entry control apparatus for controlling user's access to at least one particular area; an image forming apparatus placed in the particular area; and a usage management apparatus for managing use permission of each user for the image forming apparatus. The entry control apparatus includes: a first reader unit placed near an entrance of the particular area to read identification information of the user; and a state management unit to retain a presence state of each user in the particular area and to update the presence state of the user corresponding to the identification information read by the first reader unit. The image forming apparatus includes: a second reader unit to read the identification information of the user; an inquiry unit to inquire of the usage management apparatus for the use permission of the user corresponding to the identification information read by the second reader unit; and a manipulation enabling unit to enable acceptance of user manipulation when the usage management apparatus permits the user to use. The usage management apparatus includes: a state obtaining unit to obtain the presence state of each user, permitted to use the image forming apparatus, from the entry control apparatus; and a transition unit to cause the image forming apparatus to make a transition to a lower power consumption mode in which power consumption becomes less, when all the users permitted to use the image forming apparatus exist outside the particular area.

According to the first aspect of the present invention, the presence state of each user permitted to use the image forming apparatus is obtained from the entry control apparatus, and the image forming apparatus is caused to make a transition to the lower power consumption mode when all the users exist outside the particular area where the image forming apparatus is placed. That is, the power management is performed by focusing only on the user expected to use the image forming apparatus, so that the power management can properly be performed on the image forming apparatus.

In the power management system according to the first aspect of the present invention, preferably the image forming apparatus is configured to be selectively installed a plurality of functions, the usage management apparatus further includes an installed state obtaining unit to obtain an installed state of the function in the image forming apparatus. The transition unit preferably selects one lower power consumption mode out of a plural of the predetermined lower power consumption modes according to the installed state of the function in the image forming apparatus to cause the image forming apparatus to make a transition to the selected lower power consumption mode.

In the power management system according to the first aspect of the present invention, preferably the transition unit causes the image forming apparatus to make a transition to the lower power consumption mode when a job in processing does not exist in the image forming apparatus.

In the power management system according to the first aspect of the present invention, preferably the usage management apparatus further includes a returning unit to return the image forming apparatus to a normal operation mode from the lower power consumption mode when any one of the users, permitted to use the image forming apparatus, enters the particular area in the case where the image forming apparatus is in the lower power consumption mode.

In the power management system according to the first aspect of the present invention, the usage management apparatus is preferably configured to be able to perform data communication with a server apparatus where a groupware runs. The server apparatus preferably retains a location of each user, the location being inputted by each user. The transition unit preferably causes the image forming apparatus to make a transition to the lower power consumption mode when the locations of all the users permitted to use the image forming apparatus satisfy a predetermined condition based on the location of each user obtained from the server apparatus.

In the power management system according to the first aspect of the present invention, the entry control apparatus preferably controls entry permission of each user into the particular area based on a predetermined data table The usage management apparatus preferably permits, based on the predetermined data table, the user to use the image forming apparatus, the user being permitted to enter the particular area by the entry control apparatus.

In the power management system according to the first aspect of the present invention, the entry control apparatus preferably controls the user's access to the respective particular areas. The usage management apparatus preferably manages the use permission of each user for the respective image forming apparatuses.

A second aspect according to the present invention provides a method for power management using a system including an image forming apparatus The system includes an entry control apparatus for controlling user's access to at least one particular area, the image forming apparatus placed in the particular area, and a usage management apparatus for managing use permission of each user for the image forming apparatus. The entry control apparatus includes a first reader unit placed near an entrance of the particular area to read identification information of the user, and a state management unit to retain a presence state in each user in the particular area and to update the presence state of the user corresponding to the identification information read by the first reader unit, and the image forming apparatus includes a second reader unit to read the identification information of the user. The method for power management includes the steps of inquiring of the usage management apparatus for the use permission of the user corresponding to the identification information read by the second reader unit; enabling the user to manipulate the image forming apparatus when the usage management apparatus permits the user to use, obtaining the presence state of each user, permitted to use the image forming apparatus, from the entry control apparatus; and causing the image forming apparatus to make a transition to a lower power consumption mode in which power consumption becomes less, when all the users permitted to use the image forming apparatus exist outside the particular area.

In the method for power management according to the second aspect of the present invention, the image forming apparatus is preferably configured to be selectively installed a plurality of functions. Preferably, the method for power management further includes the step of obtaining an installed state of the function in the image forming apparatus, and the step of causing the image forming apparatus to make a transition to the lower power consumption mode includes the step of selecting one lower power consumption mode out of a plurality of the predetermined lower power consumption modes according to the installed state of the function in the image forming apparatus to cause the image forming apparatus to make a transition to the selected lower power consumption mode.

In the method for power management according to the second aspect of the present invention, the step of causing the image forming apparatus to make a transition to the lower power consumption mode preferably includes the step of causing the image forming apparatus to make a transition to the lower power consumption mode when a job in processing does not exist in the image forming apparatus.

The method for power management according to the second aspect of the present invention preferably further includes the step of returning the image forming apparatus to a normal operation mode from the lower power consumption mode when any one of the users permitted to use the image forming apparatus enters the particular area in the case where the image forming apparatus is in the lower power consumption mode.

In the method for power management according to the second aspect of the present invention, preferably the system further includes a server apparatus where a groupware runs. The server apparatus preferably retains a location of each user, the location being inputted by each user. The step of causing the image forming apparatus to make a transition to the lower power consumption mode preferably includes the step of causing the image forming apparatus to make a transition to the lower power consumption mode when the locations of all the users permitted to use the image forming apparatus satisfy a predetermined condition based on the location of each user obtained from the server apparatus.

A third aspect according the present invention provides a usage management apparatus of an image forming apparatus. The usage management apparatus is configured to be able to perform data communication with an entry control apparatus for controlling user's access to at least one particular area and the image forming apparatus placed in the particular area. The entry control apparatus includes: a first reader unit placed near an entrance of the particular area to read identification information of the user; and a state management unit to retain a presence state of each user for the particular area and to update the presence state of the user corresponding to the identification information read by the first reader unit. The image forming apparatus includes: a second reader unit to read the identification information of the user; an inquiry unit to inquire of the usage management apparatus for the use permission of the user corresponding to the identification information read by the second reader unit; and a manipulation enabling unit to enable acceptance of user manipulation when the usage management apparatus permits the user to use. The usage management apparatus includes: a state obtaining unit to obtain the presence state of each user, permitted to use the image forming apparatus, from the entry control apparatus; and a transition unit to cause the image forming apparatus to make a transition to a lower power consumption mode in which power consumption becomes less, when all the users permitted to use the image forming apparatus exist outside the particular area.

According to the present invention, the power management can properly be performed depending on the existence of the user who is expected to use each image forming apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows an example of a data structure of an entry permission table of FIG. 4.

FIG. 6 shows an example of a data structure of a presence state table of FIG. 4.

FIG. 12 shows an example of a data structure of a location area table of FIG. 9.

DESCRIPTION OF THE PREFERRED EMBODIMENTS

Figure 1:
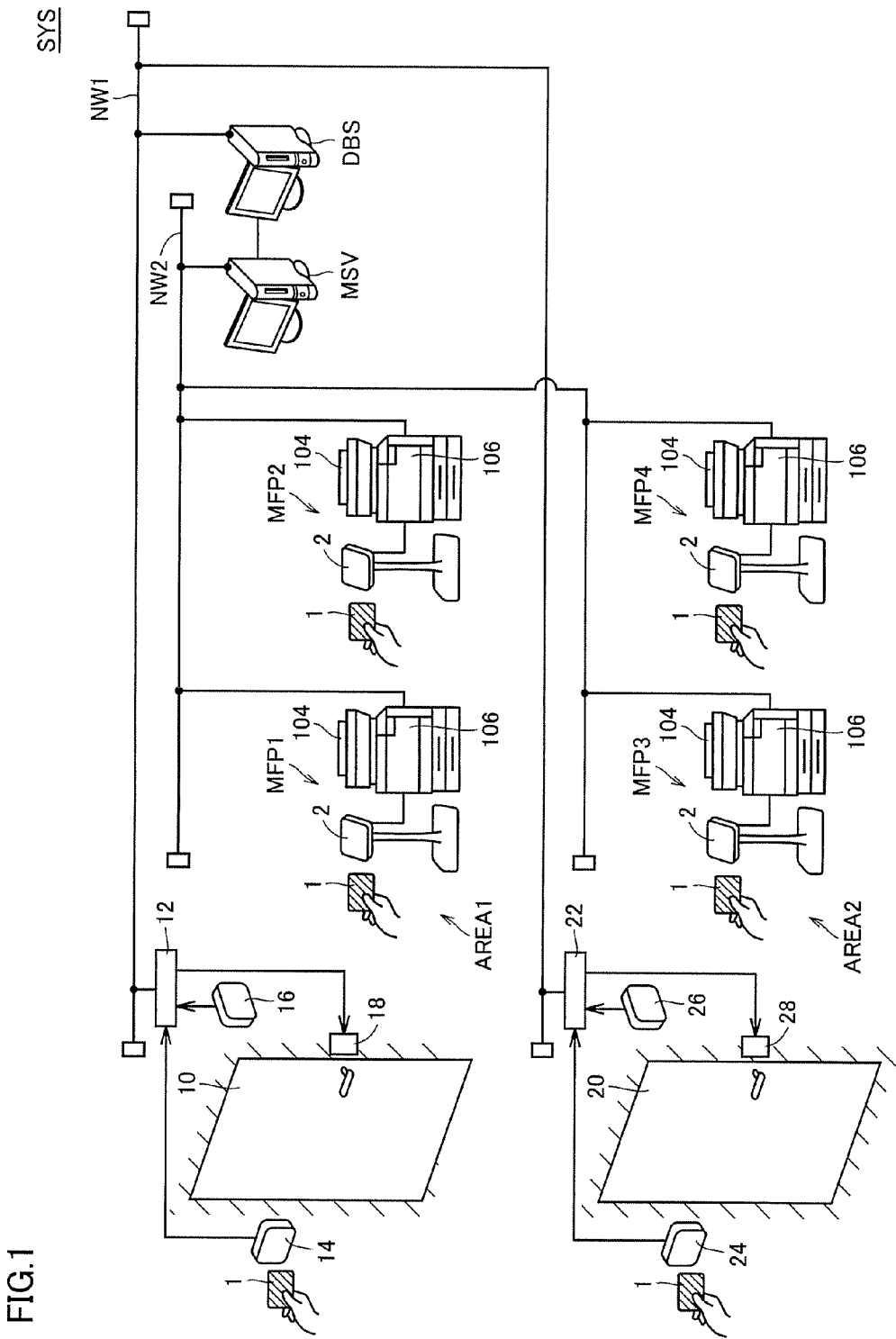
FIG. 1 shows a schematic configuration of a power management system according to an embodiment of the present invention.

Embodiments of the present invention will be described in detail with reference to the drawings. In the drawings, the same or corresponding portions are designated by the same reference numerals, and the description thereof is not repeated.

(Configuration of Entire System)

Referring to FIG. 1, a power management system SYS according to an embodiment of the present invention includes an entry control apparatus which controls user's access to at least one particular area. In the configuration of the present embodiment, the entry control apparatus typically controls access to two particular areas AREA1 and AREA2. However, the present invention is applicable to a configuration in which the entry control apparatus controls access to one or at least three particular areas.

Power management system SYS according to the present embodiment includes image forming apparatuses MFP1 and MFP2 placed in particular area AREA1, image forming apparatuses MFP3 and MFP4 placed in particular area AREA2, and a user management server MSV which manages use permission of each user for image forming apparatuses MFP1 to MFP4. Typically, image forming apparatuses MFP1 to MFP4 are an MFP (Multi Function Peripheral) which is configured to be selectively installed a plurality of functions such as a copying machine, a facsimile, and a scanner. User management server MSV is connected to image forming apparatuses MFP1 to MFP4 through a network NW2, and can perform data communication with them. User management server MSV previously restricts users who can use image forming apparatuses MFP1 to MFP4 to particular users. Further, user management server MSV is configured to be able to perform data communication with an entry control server DBS constituting the entry control apparatus. User management server MSV obtains a presence state of the user who is permitted to use each of image forming apparatuses MFP1 to MFP4 from entry control server DBS. When all the users who are permitted to use each of image forming apparatuses MFP1 to MFP4 exist outside the respective particular areas, user management server MSV causes the image forming apparatus to make a transition to a lower power consumption mode in which the power consumption becomes less. Thus, unnecessary power consumption is suppressed in the image forming apparatus. A configuration of each apparatus will be described below.

(Configuration of Entry Control Apparatus)

The entry control apparatus according to the present embodiment is configured to control the entry of the user into particular area AREA1, and the entry control apparatus includes ID reader units 14 and 16, a locking unit 18, and an entry controller 12. ID reader units 14 and 16 are disposed near a door 10 which is an entrance of particular area AREA1. Locking unit 18 locks and unlocks door 10. Entry controller 12 is connected to a network NW1, and can perform data communication with ID reader units 14 and 16 and locking unit 18. The entry control apparatus according to the present embodiment also includes entry control server DBS.

ID reader unit 14 is disposed outside particular area AREA1, and reads identification information (hereinafter also referred to as "user ID") on the user from an identification information medium possessed by the user when the user enters particular area AREA1. Examples of the identification information medium include an IC card, a barcode and a magnetic card. Biometrics such as a vein pattern or a retina pattern of the user may also be employed. In the present embodiment, an IC card 1 is used as the identification information medium. In this case, ID reader unit 14 continuously transmits a radio wave within a predetermined range to read the information, and IC card 1 receives the radio wave to send back a signal corresponding to the user ID previously stored in IC card 1. Then, ID reader unit 14 receives the signal sent back from IC card 1, and outputs the user ID to entry controller 12 based on the received signal.

On the other hand, ID reader unit 16 is disposed inside particular area AREA1, and scans the user ID from the identification information medium possessed by the user when the user leaves particular area AREA1. Because the configuration and operation of ID reader unit 16 are similar to those of ID reader unit 14, the detailed description thereof is not repeated.

Entry controller 12 transmits the user ID received from ID reader unit 14 or 16, to entry control server DBS through network NW1.

Entry control server DBS retains the presence state of each user in particular areas AREA1 and AREA2, and updates the presence state of the user corresponding to the user ID read by ID reader unit 14 or 16. More specifically, a database for indicating the presence state in particular areas AREA1 and AREA2 is stored in entry control server DBS in association with each user. When the user ID is read by ID reader unit 14, entry control server DBS updates the database, assuming that the user corresponding to the user ID enters particular area AREA1. Similarly, entry control server DBS updates the database, assuming that the user corresponding to the user ID leaves particular area AREA1, when the user ID is read by ID reader unit 16.

A database for managing entry permission of each user into particular areas AREA1 and AREA2 is also stored in entry control server DBS. When the user ID is read by ID reader unit 14, entry control server DBS refers to the database to determine whether or not the user corresponding to the user ID is permitted to enter particular area AREA1, and transmits an unlock command instructing the unlock of door 10 only when the user is permitted to enter particular area AREA1.

When entry controller 12 receives the unlock command from entry control server DBS, entry controller 12 causes locking unit 18 to unlock door 10. Then, locking unit 18 unlocks door 10 for a predetermined period so that the user can enter particular area AREA1.

The entry control apparatus according to the present embodiment is configured to control the entry of the user into particular area AREA2, and the entry control apparatus further includes ID reader units 24 and 26, a locking unit 28, and an entry controller 22. ID reader units 24 and 26 are disposed near a door 20 which is an entrance of particular area AREA2. Locking unit 28 locks and unlocks door 20. Entry controller 22 is connected to network NW1, and can perform data communication with ID reader units 24 and 26 and locking unit 28. The configurations and operations of ID reader units 24 and 26, locking unit 28, and entry controller 22 are similar to the corresponding units for controlling the entry of the user into particular area AREA1, so that the detailed description thereof is not repeated.

Figure 2:
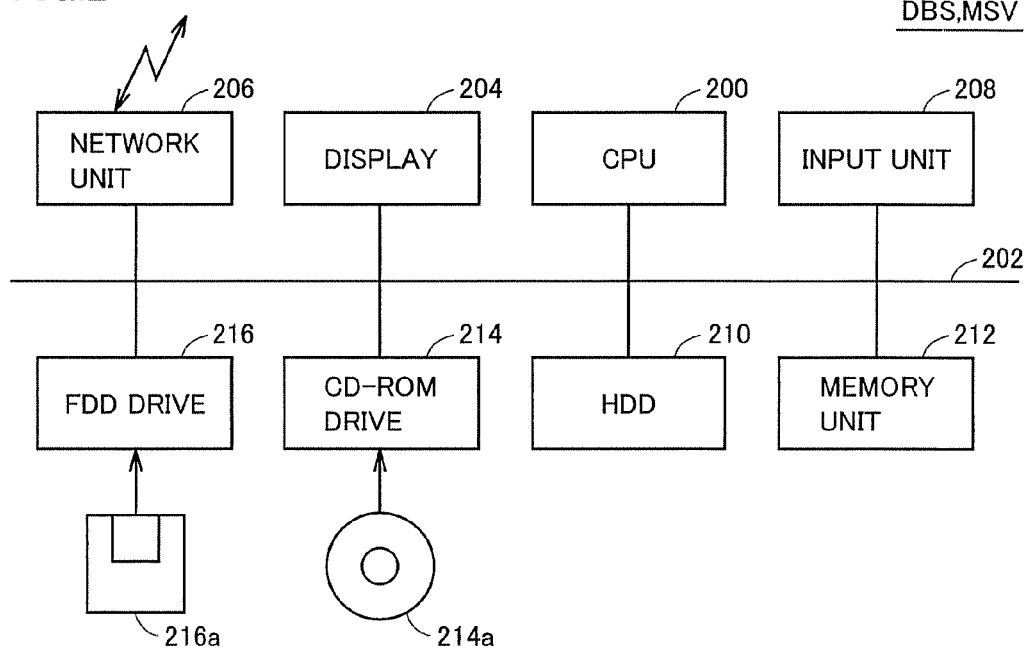
FIG. 2 is a block diagram showing a schematic hardware configuration of an entry control server according to the embodiment of the present invention.

Referring to FIG. 2, entry control server DBS according to the present embodiment includes a CPU (Central Processing Unit) 200, a memory unit 212, and a hard disk drive (HDD) 210. CPU 200 executes various programs including an operating system (OS). Data necessary to execute the program by CPU 200 is temporarily stored in memory unit 212. The program executed by CPU 200 is stored in hard disk drive 210 in a nonvolatile manner. Programs for realizing processes to be described later are previously stored in hard disk drive 210, and the programs are read from a flexible disk 216a or a CD-ROM (Compact Disk-Read Only Memory) 214a by an FDD drive 216 or a CD-ROM drive 214 respectively.

CPU 200 receives an instruction from an administrator or the like through an input unit 208 including a keyboard and a mouse, and outputs a screen output generated by the execution of the program to a display 204. Using a network unit 206 including a LAN card, CPU 200 transmits and receives data to and from entry controller 12 (FIG. 1) connected through network NW1 (FIG. 1).

(Configurations of Image Forming Apparatus and User Management Server)

As shown in FIG. 1, each of image forming apparatuses MFP1 to MFP4 (hereinafter also collectively referred to as "image forming apparatus MFP") includes an image scanner unit 104, a print unit 106, and an ID reader unit 2.

Image scanner unit 104 scans an original document as image data, and typically includes a placing stage (not shown) on which the document is set, a document platen glass (not shown), a conveyance portion (not shown) for automatically conveying the document set on the placing stage to the document platen glass sheet by sheet, and an eject stage (not shown) to which the scanned document is ejected.

Print unit 106 performs a print process for image data generated by internal processing, and includes a control device for controlling an operation of each portion, in addition to a hardware configuration for the print process.

ID reader unit 2 reads the user ID from IC card 1, and the configuration of ID reader unit 2 is similar to those of ID reader units 14 and 16. In power management system SYS according to the present embodiment, the control of user's access to particular areas AREA1 and AREA2 and the management of the user who uses image forming apparatuses MFP1 to MFP4 are realized by using the same IC card 1. The user ID read by ID reader unit 2 is transmitted to user management server MSV, so that a process of authenticating whether or not the user corresponding to the user ID is permitted to use target image forming apparatus MFP is executed.

Figure 3:
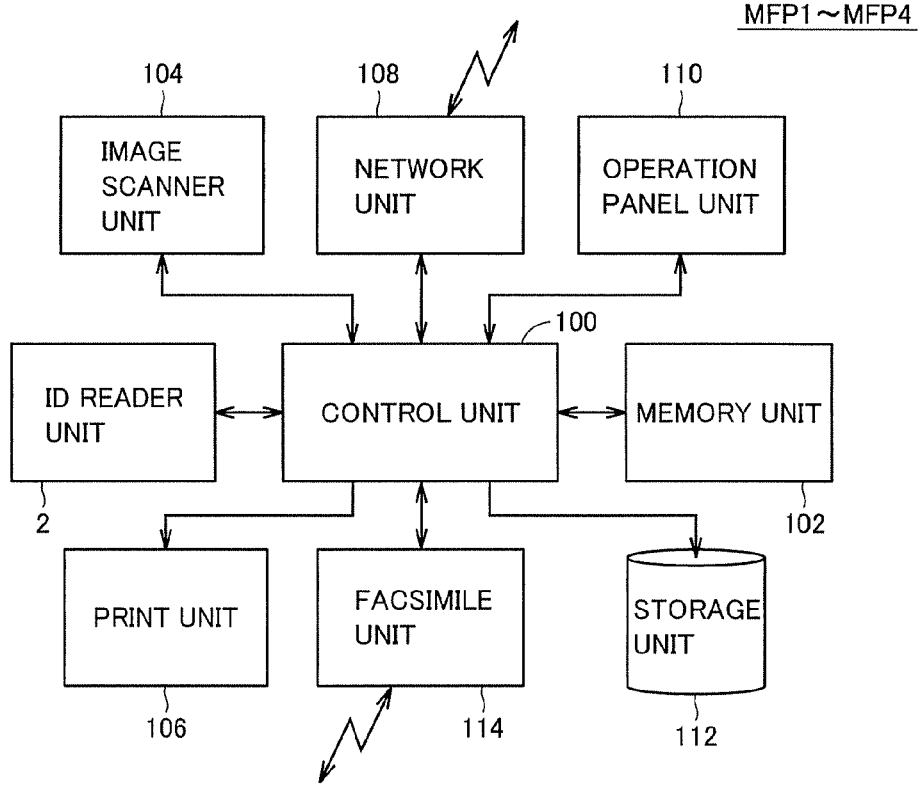
FIG. 3 is a block diagram showing a schematic hardware configuration of an image forming apparatus according to the embodiment of the present invention.

Referring to FIG. 3, each piece of image forming apparatus MFP according to the present embodiment includes a control unit 100, a memory unit 102, a network unit 108, an operation panel unit 110, a storage unit 112, and a facsimile unit 114.

Control unit 100 is typically configured by a computing device such as a CPU, and executes a program to perform the operation according to the present embodiment. Memory unit 102 typically includes a volatile storage device such as a DRAM (Dynamic Random Access Memory), and retains a program executed by control unit 100 and data necessary to execute the program. Network unit 108 performs data communication with user management server MSV connected through network NW2 (FIG. 1) Storage unit 112 typically includes a nonvolatile storage device such as a hard disk drive and a flash memory, and image data generated by control unit 100 and the like is stored in storage unit 112. Facsimile unit 114 is connected to a telephone line (not shown) to transmit and receive facsimile data to and from a destination facsimile device. That is, facsimile unit 114 transmits a document image scanned by an image scanner unit 104 in the form of facsimile data to a destination having a number inputted from operation panel unit 110, and outputs facsimile data received from another facsimile device to print unit 106 or storage unit 112.

Image forming apparatus MFP according to the present embodiment is configured to be selectively installed a plurality of functions such as a copying function, a facsimile function, and a scanner function. For example, facsimile unit 114 shown in FIG. 3 is not installed in image forming apparatus MFP which functions as a copying machine and a scanner device. In image forming apparatus MFP according to the present embodiment, some units among the units shown in FIG. 3 may not be implemented depending on the installed function.

A hardware configuration of user management server MSV is substantially similar to that of entry control server DBS shown in FIG. 2, so that the detailed description is not repeated.

In the embodiment shown in FIG. 1, entry control server DBS, ID reader units 14, 16, 24, and 26, entry controllers 12 and 22, and locking units 18 and 28 correspond to "entry control apparatus" of the present invention, image forming apparatuses MFP1 to MFP4 correspond to "image forming apparatus" of the present invention, user management server MSV corresponds to "usage management apparatus" of the present invention, ID reader units 14, 16, 24, and 26 correspond to "first reader unit" of the present invention, entry control server DBS corresponds to "state management unit" of the present invention, and ID reader unit 2 corresponds to "second reader unit" of the present invention.

(Function and Operation of Entry Control Apparatus)

Figure 4:
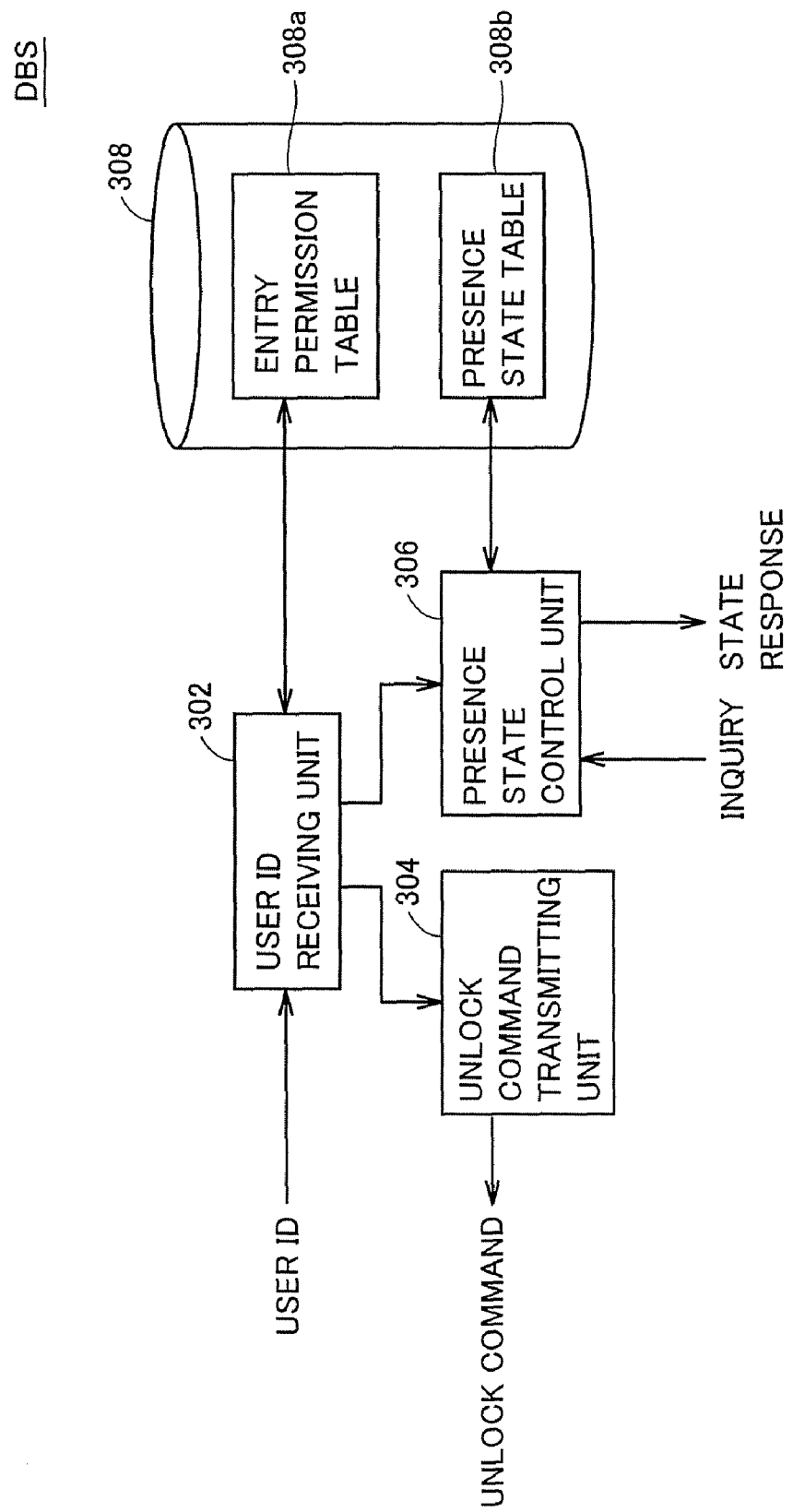
FIG. 4 is a block diagram showing a functional configuration of the entry control server according to the embodiment of the present invention.

Referring to FIG. 4, entry control server DBS according to the present embodiment includes, as its functions, a user ID receiving unit 302, an unlock command transmitting unit 304, a presence state control unit 306, and a data storage unit 308. Of these functions, data storage unit 308 is realized in hard disk drive 210 (FIG. 2), and other functions are mainly realized by CPU 200 and memory unit 212 (FIG. 2)

User ID receiving unit 302 receives the user ID which is read by each of ID reader units 14, 16, 24, and 26 (FIG. 1) and transmitted through network NW1. User ID receiving unit 302 refers to an entry permission table 308a, stored in data storage unit 308, to determine whether or not the user having the relevant user ID is permitted to enter. That is, user ID receiving unit 302 refers to entry permission table 308a to perform the user authentication process. Entry permission table 308a is previously set by an administrator or the like.

Information on permission for entry in each particular area is stored in entry permission table 308a in association with the user ID. Because a plurality of doors are sometimes provided for one particular area, the entry permission may be controlled in units of doors.

Referring to FIG. 5, four fields of "user ID", "user name", "door 10", and "door 20" are defined in entry permission table 308a, for example, and information of each user is stored in each record. For example, information on "user A" to whom "ID: 000001" is allocated as the user ID is recorded in a first record of entry permission table 308a, and "user A" is "permitted" for both door 10 and the door 20. That is, "user A" is permitted to enter particular areas AREA1 and AREA2. Similarly, information on "user B" to whom "ID: 000002" is allocated as the user ID is stored in a second record of entry permission table 308a, and information on "user C" to whom "ID: 000003" is allocated as the user ID is further stored in a third record of entry permission table 308a. "User C" is "permitted" for door 20 while "not permitted" for door 10. That is, "user C" is "permitted" to enter only particular area AREA2.

Referring to FIG. 4, user ID receiving unit 302 controls the entry of the accessing user into the particular areas based on the received user ID and a placement position of the ID reader unit that read the user ID. User ID receiving unit 302 provides an instruction to unlock command transmitting unit 304 to transmit an unlock command when the accessing user is permitted to enter the relevant particular area. In response to the instruction, unlock command transmitting unit 304 transmits the unlock command to instruct unlock of the door, which is accessed by the user, to the corresponding entry controller. The door is unlocked by the unlock command, and the user can enter or leave the particular area.

User ID receiving unit 302 outputs a command for updating the presence state of the corresponding user to presence state control unit 306 based on the received user ID. More particularly, after the unlock command is transmitted by the above process, user ID receiving unit 302 notifies presence state control unit 306 that the user having the user ID enters or leaves the corresponding particular area.

Presence state control unit 306 updates information in a presence state table 308b included in data storage unit 308 according to the notification from user ID receiving unit 302.

Referring to FIGS. 4 and 6, the presence state of each user in the particular area is stored in a presence state table 308b, and four fields of "user ID", "user name", "AREA1", and "AREA2" are defined therein, for example. Information of each user is recorded in each record. For example, information on "user A" to whom "ID: 000001" is allocated as the user ID is recorded in a first record of presence state table 308b, and the presence state in which "user A" is "OUT (out of the room)" of particular areas AREA1 and AREA2 is stored in presence state table 308b. Information on "user B" to whom "ID: 000002" is allocated as the user ID is recorded in a second record of presence state table 308b, and the presence state in which "user B" is "IN (in the room)" particular area AREA1 and "OUT (out of the room)" of particular area AREA2 is stored in presence state table 308b.

Presence state control unit 306 updates a value of the record corresponding to the user ID in presence state table 308b according to the notification from the user ID receiving unit 302.

Referring to FIG. 4, when presence state control unit 306 receives an inquiry about the presence state from user management server MSV (FIG. 1), presence state control unit 306 refers to presence state table 308b to respond the presence state of each user. The process is described later.

Figure 7:
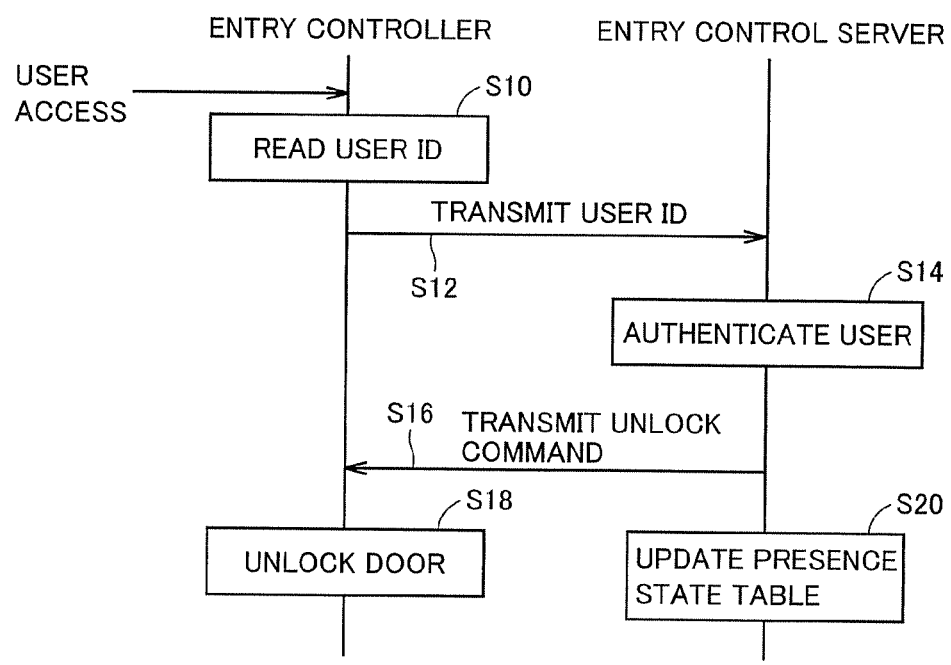
FIG. 7 is a sequence diagram showing processing procedure in an entry control system according to the embodiment of the present invention.

Referring to FIG. 7, a processing procedure in the entry control system according to the present invention will be described below.

When the user accesses to any one of the ID reader units, the ID reader unit reads the user ID from IC card 1 (step S10). The entry controller corresponding to the relevant ID reader unit transmits the read user ID to entry control server DBS (step S12). Entry control server DBS performs the user authentication process on the received user ID (step S14). When the user authentication is completed on the received user ID, entry control server DBS transmits the unlock command to the entry controller (step S16). Then, the entry controller provides the unlock command to the locking unit to unlock the door (step S18). Entry control server DBS updates the value corresponding to the received user ID in presence state table 308b (step S20).

When the user authentication process fails in step S14, the procedure does not proceed any further.

As described above, the entry control process is performed for the particular area each time the user access is occurred.

(Function and Operation of Image Forming Apparatus)

Figure 8:
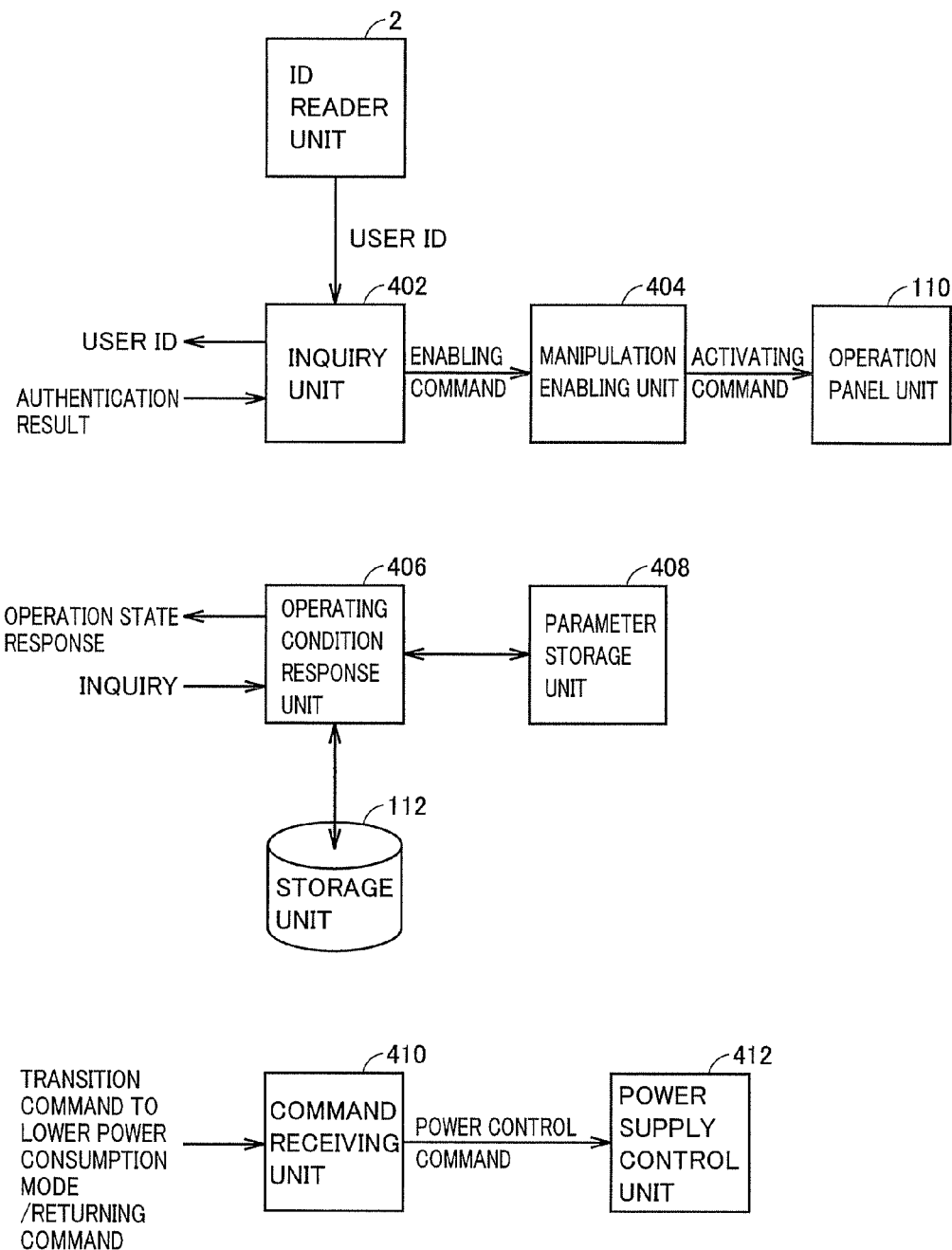
FIG. 8 is a block diagram showing a functional configuration of the image forming apparatus according to the embodiment of the present invention.

Referring to FIG. 8, image forming apparatus MFP according to the present embodiment includes, as its functions, an inquiry unit 402, a manipulation enabling unit 404, an operating condition response unit 406, a parameter storage unit 408, a command receiving unit 410, and a power supply control unit 412. These functions are mainly realized by control unit 100 and memory unit 102 (FIG. 3).

Inquiry unit 402 inquires of user management server MSV for use permission of the user corresponding to the user ID read by ID reader unit 2. Specifically, when the user brings IC card 1 (FIG. 1) close to ID reader unit 2 and inquiry unit 402 receives the relevant user ID read by ID reader unit 2, inquiry unit 402 transmits the relevant user ID to user management server MSV. As will be described later, user management server MSV performs the authentication process on the user ID, and sends back an authentication result to inquiry unit 402. Further, inquiry unit 402 outputs an enabling command to manipulation enabling unit 404 based on the authentication result in the case where the user is permitted to use image forming apparatus MFP.

When manipulation enabling unit 404 receives the enabling command from inquiry unit 402, manipulation enabling unit 404 outputs an activating command to operation panel unit 110 to enable acceptance of user manipulation. When operation panel unit 110 receives the activating command, operation panel unit 110 comes into the state in which the user manipulation can be received. This enables the user to use image forming apparatus MFP.

Operating condition response unit 406 and parameter storage unit 408 send back an operating condition of image forming apparatus MFP in response to an inquiry from user management server MSV. Specifically, when operating condition response unit 406 receives an inquiry from user management server MSV, operating condition response unit 406 refers to storage unit 112 to determine whether or not a job in processing exists. Typically the job in processing shall mean data waiting for print in print unit 106 (FIGS. 1 and 3) and data whose print is reserved. When operating condition response unit 406 receives the inquiry from user management server MSV, operating condition response unit 406 obtains an installed state of the function in image forming apparatus MFP from parameter storage unit 408. The installed state of the function shall mean information indicating which of the plurality of functions such as the copying function, the facsimile function, and the scanner function is installed in image forming apparatus MFP. A parameter indicating the installed state of the function in image forming apparatus MFP is previously stored in parameter storage unit 408, and parameter storage unit 408 sends back the parameter upon request from operating condition response unit 406. The parameters are set at a stage where each function is installed (typically, during production, or in adding the function after the use is started). Alternatively, parameter storage unit 408 may automatically detect an added function to update the parameter.

After the above process, operating condition response unit 406 sends back the operating condition including the information, indicating whether or not the job in processing exists and the installed state of the function in image forming apparatus MFP, to user management server MSV. A process performed with the operating condition response by user management server MSV will be described later.

Command receiving unit 410 and power control unit 412 respond a transition command to the lower power consumption mode from user management server MSV to cause image forming apparatus MFP to make a transition to a predetermined lower power consumption mode. The lower power consumption mode shall mean a mode in which the power consumption of image forming apparatus MFP is reduced compared with a normal operation. The lower power consumption mode includes a mode in which the image forming apparatus is set in the standby state, a mode in which the image forming apparatus is turned off, and a mode in which the image forming apparatus is set in the state for reducing power consumption.

Command receiving unit 410 and power control unit 412 respond to a returning command from user management server MSV to return to the normal operation mode from the lower power consumption mode. When command receiving unit 410 receives the transition command to the lower power consumption mode from user management server MSV, command receiving unit 410 outputs a predetermined power control command to power control unit 412 according to the selected mode. Power control unit 412 cuts off or reduces the electric power supply to a predetermined unit of the units constituting image forming apparatus MFP in response to the power control command from command receiving unit 410. As will be described later, one lower power consumption mode selected from a plurality of lower power consumption modes may be defined in the transition command to the lower power consumption mode, and power control unit 412 properly selects the unit to which the electric power supply is cut off or reduced according to the selected lower power consumption mode.

For example, in image forming apparatus MFP in which the facsimile function is installed, it is necessary to print the received facsimile data even if there is not a possibility that the user uses image forming apparatus MFP. On the other hand, in image forming apparatus MFP in which the copying function and the scanner function are installed while the facsimile function is not installed, when there is not a possibility that the user uses the image forming apparatus MFP, it is not necessary to perform the print process. Accordingly, in image forming apparatus MFP in which the facsimile function is installed, it is necessary to maintain image forming apparatus MFP in a standby state (pre-heated state) in which the print process can be resumed in a relatively short time in print unit 106 so that the print process can be performed upon receiving the facsimile data. On the other hand, in image forming apparatus MFP in which the facsimile function is not installed, print unit 106 can be set in a complete rest state. Therefore, either of the mode in which print unit 106 is set in the complete rest state (electric power supply cut-off state) or the mode in which print unit 106 is maintained in the standby state is designated in the transition command to the lower power consumption mode according to the present embodiment.

Thus, image forming apparatus MFP according to the present embodiment makes a transition to a different lower power consumption mode according to the installed function. Many more lower power consumption modes may be set according to the function installed in image forming apparatus MFP.

In the embodiment shown in FIG. 8, inquiry unit 402 corresponds to "inquiry unit" of the present invention, and manipulation enabling unit 404 corresponds to "manipulation enabling unit" of the present invention.

(Function and Operation of User Management Server)

Figure 9:
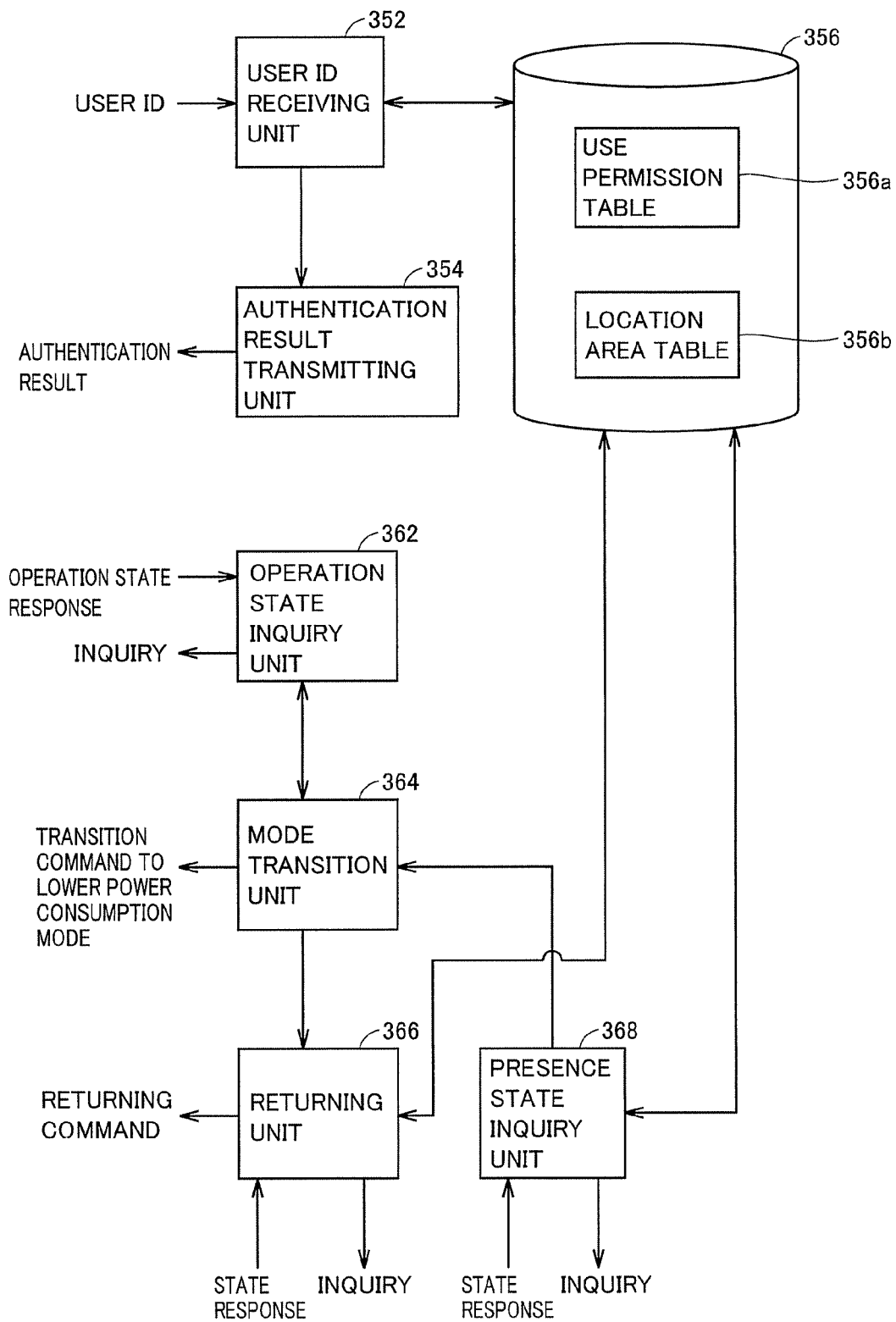
FIG. 9 is a block diagram showing a functional configuration of a user management server according to the embodiment of the present invention.

Referring to FIG. 9, user management server MSV according to the present embodiment includes, as its functions, a user ID receiving unit 352, an authentication result transmitting unit 354, a data storage unit 356, an operating condition inquiry unit 362, a mode transition unit 364, a returning unit 366, and a presence state inquiry unit 368. Among the functions, data storage unit 356 is realized in hard disk drive 210 (FIG. 2), and other functions are mainly realized by CPU 200 and memory unit 212 (FIG. 2).

User ID receiving unit 352 and authentication result transmitting unit 354 determine whether or not the user corresponding to the user ID transmitted from inquiry unit 402 (FIG. 8) of image forming apparatus MFP can use relevant image forming apparatus MFP. That is, user ID receiving unit 352 and authentication result transmitting unit 354 perform the user authentication process for the user who is going to use image forming apparatus MFP. Specifically, when user ID receiving unit 352 receives the user ID from any piece of image forming apparatus MFP, user ID receiving unit 352 refers to a use permission table 356a stored in data storage unit 356, and determines whether or not the user corresponding to the user ID is permitted to use image forming apparatus MFP as a transmission source.

Figures 10, 11:
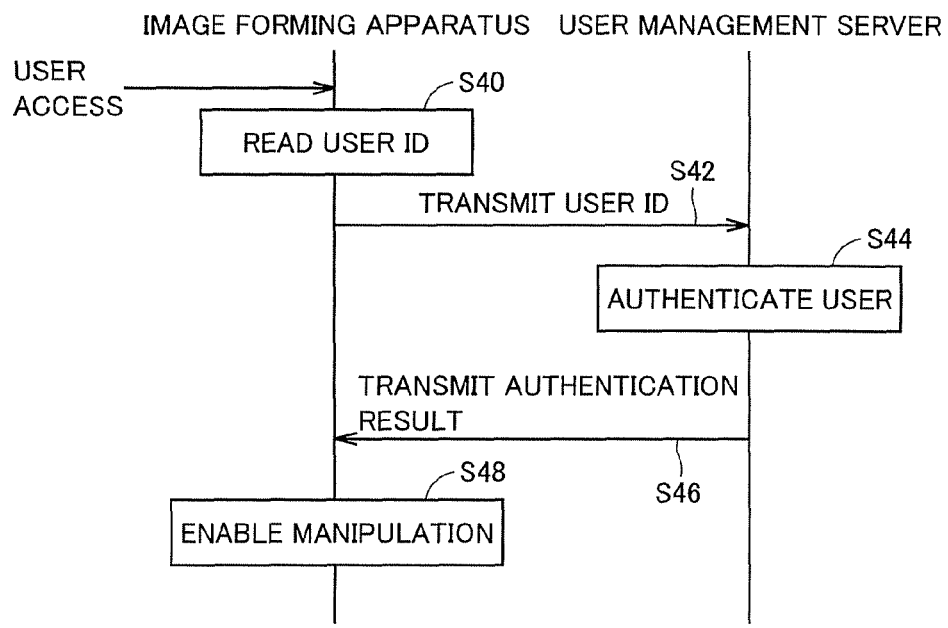
FIG. 10 shows an example of a data structure of a use permission table of FIG. 9.
FIG. 11 is a sequence diagram showing a processing procedure concerning user authentication to the image forming apparatus according to the embodiment of the present invention.

Referring to FIGS. 9 and 10, five fields of "user ID", "MFP1", "MFP2", "MFP3", and "MFP4" are defined in use permission table 356a, for example, and information of each user is recorded in each record. For example, information on the user to whom "ID: 000001" is allocated as the user ID is stored in a first record of use permission table 356a, and the user is permitted to use image forming apparatuses MFP1 and MFP2 while not permitted to use image forming apparatuses MFP3 and MFP4. Similarly, pieces of information on the users to whom "ID: 000002" to "ID: 000004" are allocated as the user ID are recorded in second to fourth records of use permission table 356a, respectively.

When image forming apparatus MFP1 transmits an inquiry about whether or not the user having the user ID "ID: 000001" can use image forming apparatus MFP1, user ID receiving unit 352 generates an authentication result by referring to a value corresponding to the field of "MFP1" ("permitted" in the example) in the records in which the user ID is "ID: 000001" of the use permission table 356a.

User ID receiving unit 352 outputs the generated authentication result to authentication result transmitting unit 354. Authentication result transmitting unit 354 transmits the authentication result from user ID receiving unit 352 to relevant image forming apparatus MFP of the transmission source of the user ID.

Referring to FIG. 11, a processing procedure of the user authentication for image forming apparatus MFP according to the present embodiment will be described below.

When the user accesses any one piece of image forming apparatus MFP and brings IC card 1 close to ID reader unit 2, ID reader unit 2 reads the user ID from IC card 1 (step S40). Inquiry unit 402 (FIG. 8) of relevant image forming apparatus MFP transmits the user ID read by ID reader unit 2 to user management server MSV (step S42). User management server MSV performs the above-described user authentication process on the received user ID (step S44). User management server MSV transmits the result of the user authentication process to relevant image forming apparatus MFP (step S46). When the user is authenticated in receiving the authentication result, relevant image forming apparatus MFP makes a transition to the state in which the user can manipulate that (step S48). On the other hand, when the user is not authenticated, relevant image forming apparatus MFP is maintained in the state in which it does not accept the user manipulation.

Thus, the user authentication process is performed every time the user accesses image forming apparatus MFP.

Referring to FIG. 9, presence state inquiry unit 368, operating condition inquiry unit 362, and mode transition unit 364 cause image forming apparatus MFP to make a transition to the lower power consumption mode in which the power consumption is reduced, when all the users permitted to use image forming apparatus MFP exist outside the particular area where relevant image forming apparatus MFP is placed. That is, the units cause image forming apparatus MFP to make a transition to the lower power consumption mode when all the users expected to use image forming apparatus MFP leave the corresponding particular area.

Presence state inquiry unit 368 obtains the presence state from entry control server DBS of each user permitted to use image forming apparatus MFP. Specifically, presence state inquiry unit 368 refers to use permission table 356a stored in data storage unit 356 to extract the user permitted to use image forming apparatus MFP, and determines whether or not the extracted user exists in the corresponding particular area. Presence state inquiry unit 368 refers to a location area table 356b stored in data storage unit 356, and detects the particular area where each piece of image forming apparatus MFP is placed.

Referring to FIGS. 9 and 12, two fields of "model ID" and "location area" are defined in location area table 356b, for example, and information of each piece of image forming apparatus MFP is stored in each record. For example, information indicating that image forming apparatus MFP1 to which "MFP1" is allocated as the model ID is placed in the particular area of "AREA1" is recorded in a first record of location area table 356b. Similarly, information indicating that image forming apparatuses MFP2 to MFP4 to which "MFP2" to "MFP4" are allocated as the model ID are recorded in second to fourth records of location area table 356b respectively. Data contents of location area table 356b may be manually set when each piece of image forming apparatus MFP is placed. Alternatively, location area table 356b may be generated by obtaining data indicating the placement site, which is previously stored in each piece of image forming apparatus MFP.

For example, when the presence state of each user permitted to use image forming apparatus MFP1 is obtained, presence state inquiry unit 368 refers to contents recorded in the record of which the model ID is "MFP1" of location area table 356b, and obtains information indicating that image forming apparatus MFP1 is placed in particular area "AREA1". Then, presence state inquiry unit 368 refers to use permission table 356a (FIG. 10) stored in data storage unit 356, and obtains the user ID corresponding to the record in which "permitted" is recorded in the record of "MFP1". Referring to FIG. 10, three users, to whom "ID: 000001", "ID: 000003", and "ID: 000004" are allocated, are permitted to use image forming apparatus MFP1. Therefore, presence state inquiry unit 368 extracts the user IDs of the three users to inquire from entry control server DBS for the presence state of each user for particular area "AREA1". Then, presence state control unit 306 (FIG. 4) of entry control server DBS refers to presence state table 308b (FIG. 6) in data storage unit 308 to transmit a presence state response of the user having the inquired user ID. When presence state inquiry unit 368 receives the presence state response transmitted from presence state table 308b (FIG. 6), presence state inquiry unit 368 outputs the presence state response to mode transition unit 364. In FIG. 6, the presence states of the three users (user A, user C, and user D) to whom "ID: 000001", "ID: 000003", "ID: 000004" are allocated in particular area "AREA1" are "OUT (out of the room)". Therefore, the presence state response transmitted from presence state inquiry unit 368 to mode transition unit 364 indicates that all the users permitted to use image forming apparatus MFP1 do not exist in particular area AREA1.

Operating condition inquiry unit 362 inquires of each piece of image forming apparatus MFP for the operating condition. Specifically, operating condition inquiry unit 362 transmits the inquiry about the operating condition to each piece of image forming apparatus MFP Then, as described above, operating condition response unit 406 (FIG. 8) of each piece of image forming apparatus MFP sends back an operating condition response including the information indicating whether or not a job in processing exists and the installed state of the function in relevant image forming apparatus MFP. Operating condition inquiry unit 362 outputs the operating condition response received from each piece of image forming apparatus MFP to mode transition unit 364.

On the basis of the presence state response from presence state inquiry unit 368 and the operating condition response from operating condition inquiry unit 362, mode transition unit 364 determines whether or not each piece of image forming apparatus MFP is required to make a transition to the lower power consumption mode, and to which lower power consumption mode each piece of image forming apparatus MFP should make a transition. Specifically, mode transition unit 364 determines that image forming apparatus MFP is required to make a transition to the lower power consumption mode when, in the presence state response from the presence state inquiry unit 368, all the users, permitted to use image forming apparatus MFP, exist outside the particular area (leave the particular area) where image forming apparatus MFP is placed. Mode transition unit 364 selects one lower power consumption mode from a plurality of predetermined lower power consumption modes based on the installed state of the function in the operating condition response from operating condition inquiry unit 362. As described above, examples of the plurality of lower power consumption modes include the rest state mode and the standby mode, and one of the rest state mode and the standby mode is selected depending on the presence/absence of the installation of the facsimile function. On the basis of the operating condition response from operating condition inquiry unit 362, when a job in processing exists in target image forming apparatus MFP, mode transition unit 364 does not cause target image forming apparatus MFP to make a transition to the lower power consumption mode until the job is completed.

Mode transition unit 364 transmits a transition command to the lower power consumption mode, generated by the above process, to target image forming apparatus MFP. As described above, image forming apparatus MFP which has received the transition command to the lower power consumption mode makes a transition to the designated lower power consumption mode.

Figure 13:
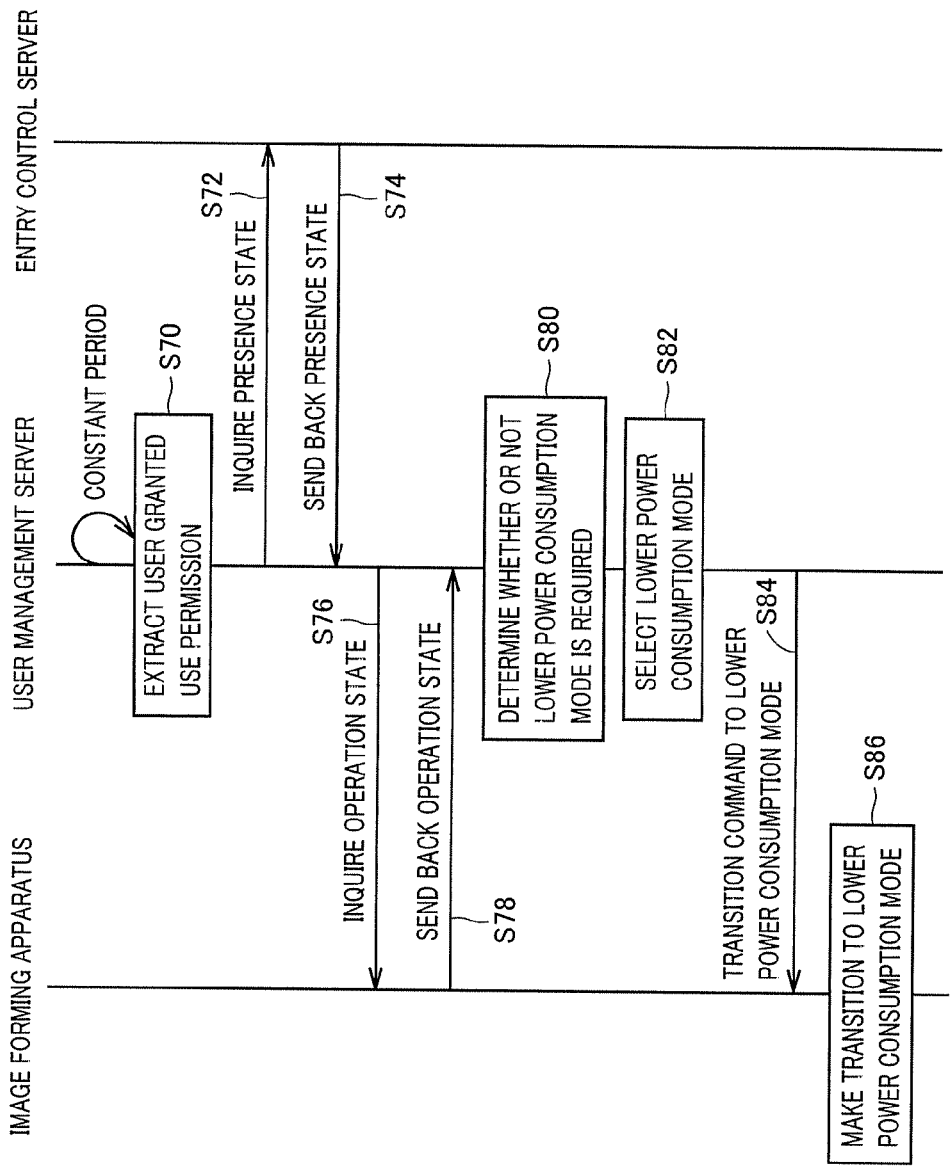
FIG. 13 is a sequence diagram showing a processing procedure concerning transition to a lower power consumption mode for the image forming apparatus according to the embodiment of the present invention.

Referring to FIG. 13, a processing procedure, for the process of causing image forming apparatus MFP to make a transition to the lower power consumption mode, will be described.

Presence state inquiry unit 368 (FIG. 9) of user management server MSV refers to use permission table 356*a* stored in data storage unit 356, and extracts the user permitted to use target image forming apparatus MFP (step S70). The user extraction process is repeatedly performed in constant periods (for example, every 30 minutes). Then, presence state inquiry unit 368 of user management server MSV inquires of entry control server DBS for the presence state of the extracted user in the particular area where target image forming apparatus MFP is placed (step S72). In response to the inquiry about the presence state, presence state control unit 306 (FIG. 4) of entry control server DBS refers to presence state table 308*b* (FIG. 4) of data storage unit 308 to send back the presence state of the inquired user (step S74).

Operating condition inquiry unit 362 (FIG. 9) of user management server MSV inquires of target image forming apparatus MFP for the operating condition (step S76). In response to the inquiry about the operating condition, operating condition response unit 406 (FIG. 8) of target image forming apparatus MFP sends back the operating condition (step S78).

It is not always necessary to simultaneously perform the presence state inquire process shown in steps S72 and S74 and the operating condition inquire process shown in steps S76 and S78, and these inquire processes may be performed in different periods respectively.

Then, on the basis of the presence state response obtained in the processes of steps S72 and S74, mode transition unit 364 (FIG. 9) of user management server MSV determines whether or not target image forming apparatus MFP is required to make a transition to the lower power consumption mode (step S80). When target image forming apparatus MFP is required to make a transition to the lower power consumption mode, mode transition unit 364 (FIG. 9) of user management server MSV selects the lower power consumption mode, to which target image forming apparatus MFP should make a transition, based on the operating condition response obtained in the processes of steps S76 and S78 (step S82). Mode transition unit 364 (FIG. 9) of user management server MSV transmits the transition command to the lower power consumption mode to target image forming apparatus MFP (step S84). Target image forming apparatus MFP makes a transition to the lower power consumption mode according to the transition command to the lower power consumption mode (step S86).

Thus, the process of causing image forming apparatus MFP to make a transition to the lower power consumption mode is performed.

Referring to FIG. 9 again, returning unit 366 returns image forming apparatus MFP in the lower power consumption mode to the normal operation mode when any one of the users, permitted to use that, enters the particular area where the relevant image forming apparatus MFP is placed. Specifically, returning unit 366 obtains the information from mode transition unit 364 for specifying image forming apparatus MFP which has made the transition to the lower power consumption mode. Returning unit 366 obtains the presence state of each user, permitted to use each piece of image forming apparatus MFP in the lower power consumption mode, from entry control server DB S. The process of obtaining the presence state is similar to the process in presence state inquiry unit 368 described above, so that the detailed description is not repeated.

When any one of the users permitted to use image forming apparatus MFP enters the corresponding particular area, returning unit 366 transmits a returning command to corresponding image forming apparatus MFP. In response to the returning command, command receiving unit 410 (FIG. 8) of target image forming apparatus MFP outputs a power control command for returning to the normal operation mode to power control unit 412 (FIG. 8). Then, power supply control unit 412 returns electric power supply to each unit to the normal mode. Thus, image forming apparatus MFP is returned from the lower power consumption mode to the normal mode at the timing of the user, permitted to use that, entering the particular area where relevant image forming apparatus MFP is placed. Therefore, image forming apparatus MFP can rapidly be set in the usable state while the unnecessary power consumption is suppressed.

In the embodiment shown in FIG. 9, presence state inquiry unit 368 corresponds to "state obtaining unit" of the present invention, mode transition unit 364 corresponds to "transition unit" of the present invention, operating condition inquiry unit 362 corresponds to "installed state obtaining unit" of the present invention, and returning unit 366 corresponds to "returning unit" of the present invention.

(Process Flow)

Figure 14:
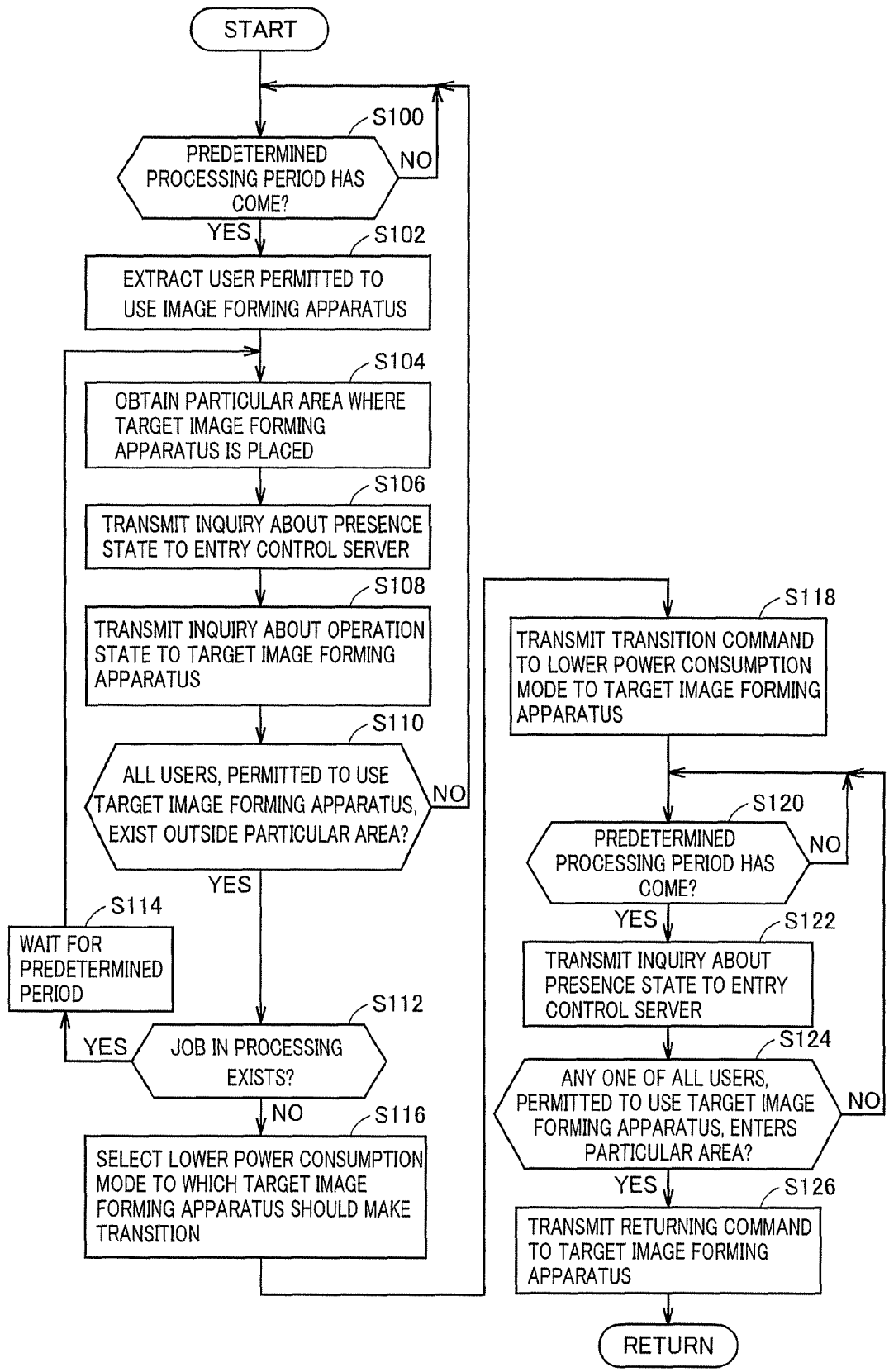
FIG. 14 is a flowchart showing a procedure of a process of the transition to the lower power consumption mode in the user management server according to the embodiment of the present invention.

Referring to FIG. 14, a procedure of the transition to the lower power consumption mode in user management server MSV according to the present embodiment will be described below. The processes shown in FIG. 14 are independently performed on each piece of image forming apparatus MFP.

Referring to FIGS. 9 and 14, CPU 200 which functions as presence state inquiry unit 368 determines whether or not a predetermined processing period has come (step S100). When the predetermined processing period has not come (NO in step S100), the process of step S100 is repeatedly performed.

When the predetermined processing period has come (YES in step S100), CPU 200 which functions as presence state inquiry unit 368 refers to use permission table 356*a* stored in hard disk drive 210, and extracts the user permitted to use target image forming apparatus MFP (step S102). CPU 200 which functions as presence state inquiry unit 368 refers to location area table 356*b* stored in hard disk drive 210, and obtains the particular area where target image forming apparatus MFP is placed (step S104). CPU 200 which functions as presence state inquiry unit 368 then transmits an inquiry about the presence state of the user extracted in step S102 in the particular area obtained in step S104 to entry control server DBS (step S106). CPU 200 which functions as presence state inquiry unit 368 waits for reception of the presence state response from entry control server DBS.

CPU 200 which functions as presence state inquiry unit 368 transmits an inquiry about the operating condition to target image forming apparatus MFP (step S108). CPU 200 which functions as presence state inquiry unit 368 waits for reception of the operating condition response from the target image forming apparatus MFP.

When CPU 200 which functions as mode transition unit 364 receives the presence state response and the operating condition response, CPU 200 determines whether or not all the users permitted to use target image forming apparatus MFP exist outside the particular area (step S110). When any one of the users permitted to use target image forming apparatus MFP exists in the particular area (NO in step S110) the procedure returns to step S100.

When all the users permitted to use target image forming apparatus MFP exist outside the particular area (YES in step S110), CPU 200 which functions as mode transition unit 364 determines whether or not a job in processing exists in target image forming apparatus MFP based on the operating condition response from target image forming apparatus MFP (step S112). When a job in processing exists in target image forming apparatus MFP (YES in step S112), CPU 200 which functions as mode transition unit 364 waits for a predetermined period (for example, 30 minutes) (step S114). Then, the processes from step S104 are performed again.

When a job in processing does not exist in target image forming apparatus MFP (NO in step S112), CPU 200 which functions as mode transition unit 364 selects the lower power consumption mode to which target image forming apparatus MFP should make a transition based on the operating condition response from target image forming apparatus MFP (step S116). Typically, CPU 200 which functions as mode transition unit 364 selects the standby mode in the case where the facsimile function is installed in target image forming apparatus MFP, and CPU 200 selects the rest state mode in the case where the facsimile function is not installed in target image forming apparatus MFP. Then, CPU 200 which functions as mode transition unit 364 transmits the transition command to a lower power consumption mode to target image forming apparatus MFP according to the selected lower power consumption mode (step S118). Therefore, target image forming apparatus MFP makes a transition to the lower power consumption mode.

When target image forming apparatus MFP makes a transition to the lower power consumption mode, it is determined whether or not a predetermined processing period has come (step S120). When the predetermined processing period has not come (NO in step S120), the process of step S120 is repeatedly performed.

When the predetermined processing period has come (YES in step S120), CPU 200 which functions as returning unit 366 transmits an inquiry about the presence state of the user extracted in step S102 to entry control server DBS (step S122) CPU 200 which functions as returning unit 366 waits for reception of the presence state response from the entry control server DBS. When CPU 200 which functions as returning unit 366 receives the presence state response, CPU 200 determines whether or not any one of the users permitted to use target image forming apparatus MFP enters the corresponding particular area (step S124).

When any one of the users, permitted to use target image forming apparatus MFP, is not in the particular area (NO in step S124), the procedure returns to step S120.

When any one of the users, permitted to use target image forming apparatus MFP, is in the particular area (YES in step S124), CPU 200 which functions as returning unit 366 transmits a returning command to target image forming apparatus MFP (step S126). Therefore, target image forming apparatus MFP returns from the lower power consumption mode to the normal operation mode. Then, the processes from step S100 are performed again.

Figure 15:
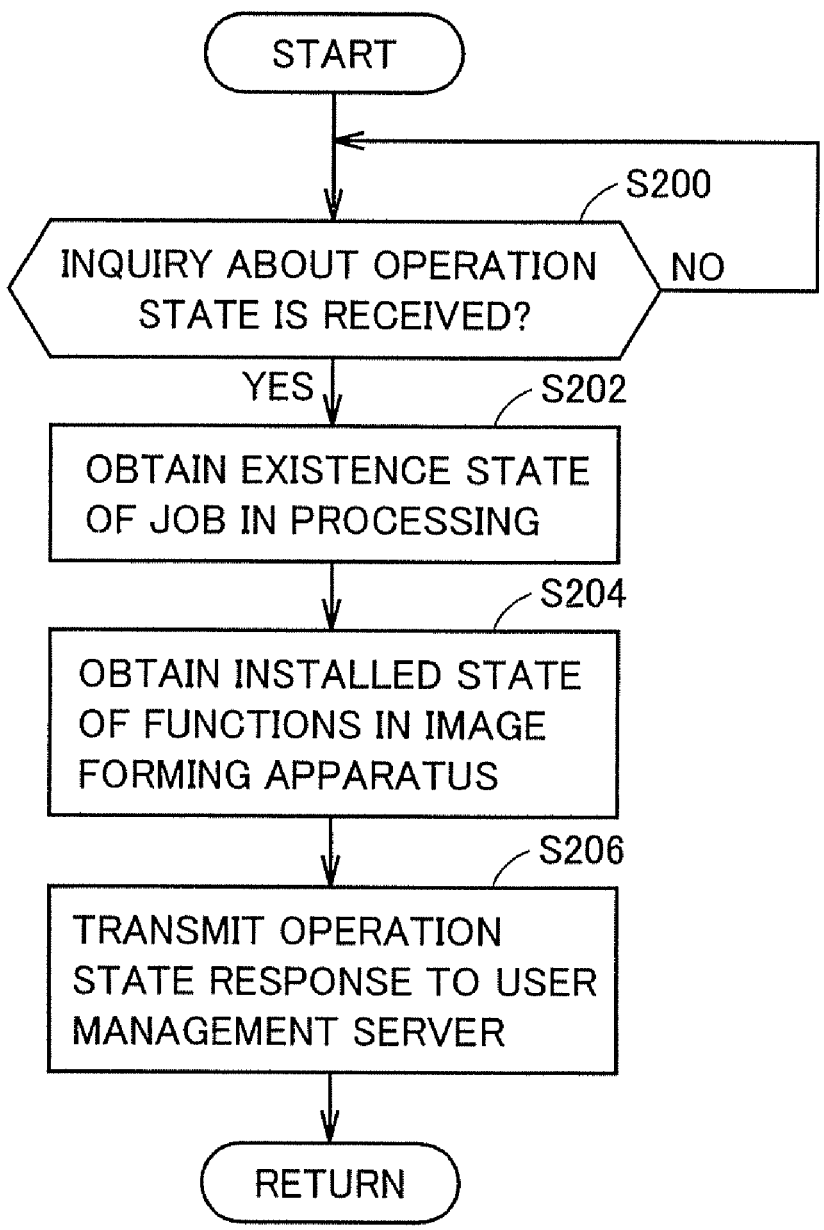
FIG. 15 is a flowchart showing a procedure of a response process of an operating condition in the image forming apparatus according to the embodiment of the present invention.

Referring to FIG. 15, a procedure for the operating condition response process in image forming apparatus MFP according to the present embodiment will be described below. The process shown in FIG. 15 is performed in each piece of image forming apparatus MFP.

Referring to FIGS. 8 and 15, control unit 100 which functions as operating condition response unit 406 determines whether or not an inquiry about the operating condition is received from user management server MSV (step S200). When the inquiry about the operating condition is not received (NO in step S200), the process of step S200 is repeatedly performed.

When the inquiry about the operating condition is received (YES in step S200), control unit 100 which functions as operating condition response unit 406 refers to storage unit 112 to obtain an existence state of a job in processing (step S202). Control unit 100 which functions as operating condition response unit 406 refers to parameter storage unit 408 to obtain the installed state of the function in image forming apparatus MFP (step S204). Control unit 100 which functions as operating condition response unit 406 transmits an operating condition response to user management server MSV (step S206). The operating condition response includes the existence state of a job in processing obtained in step S202 and the installed state of the function obtained in step S204. Then, the processes from step S200 are performed again.

Figure 16:
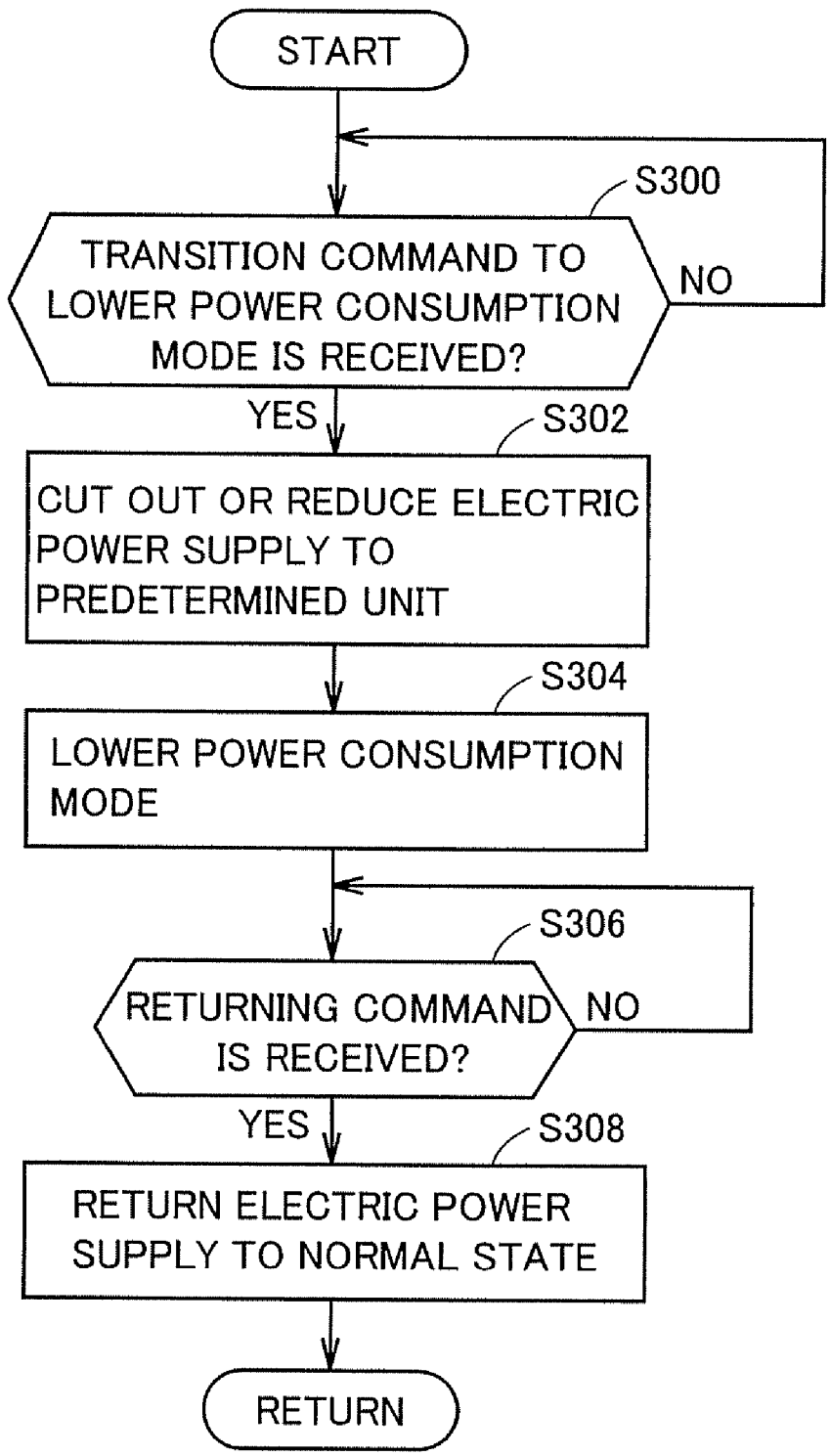
FIG. 16 is a flowchart showing a procedure of a process of the transition to the lower power consumption mode in the image forming apparatus according to the embodiment of the present invention.

Referring to FIG. 16, a procedure for the lower power consumption mode transition process in image forming apparatus MFP according to the present embodiment will be described below. The process shown in FIG. 16 is performed in each piece of image forming apparatus MFP.

Referring to FIGS. 8 and 16, control unit 100 which functions as command receiving unit 410 determines whether or not the transition command to a lower power consumption mode is received from user management server MSV (step S300). When the transition command to the lower power consumption mode is not received (NO in step S300), the process of step S300 is repeatedly performed.

When the transition command to the lower power consumption mode is received (YES in step S300), control unit 100 which functions as power control unit 412 cuts off or reduces the electric power supply to a predetermined unit according to the transition command to the lower power consumption mode (step S302), and image forming apparatus MFP makes a transition to the lower power consumption mode (step S304).

In the lower power consumption mode, control unit 100 which functions as command receiving unit 410 determines whether or not a returning command is received from user management server MSV (step S306). When the returning command is not received (NO in step S306), the process of step S306 is repeatedly performed.

When a returning command is received (YES in step S306), control unit 100 which functions as power control unit 412 returns the electric power supply to each unit to the normal state (step S308), and image forming apparatus MFP returns to the normal mode. Then, the processes from step S300 are performed again.

According to the embodiment of the present invention, user management server MSV obtains the presence state of each user permitted to use image forming apparatus MFP from entry control server DBS, and target image forming apparatus is caused to make a transition to the lower power consumption mode when all the users exist outside the particular area (leave the particular area) where target image forming apparatus MFP is placed. That is, because the power management is performed by focusing on the user who is expected to use image forming apparatus MFP, the power management can be performed more properly as compared with the case in which the power management is merely performed based on the presence or absence of the user in the particular area.

According to the embodiment of the present invention, user management server MSV changes the substance of the lower power consumption mode according to the function installed in target image forming apparatus MFP. Therefore, the power management can properly be performed without hindering the function of the image forming apparatus even if the image forming apparatuses in which the power can completely be turned off and which can be changed only to the standby mode are intermingled.

(First Modification)

In the above embodiment, entry control server DBS controls the entry of the user into each particular area based on entry permission table 308a (FIG. 5), and user management server MSV manages the use permission of each user for each piece of image forming apparatus MFP based on permission table 356a (FIG. 10). According to the configuration of the embodiment, a high degree of flexibility is achieved because each piece of image forming apparatus MFP can independently be managed. However, when a new user is added, it is necessary to update each table.

Therefore, a configuration in which commonality of two tables is achieved may be adopted. That is, the same function as use permission table 356a can be realized using entry permission table 308a and location area table 356b (FIG. 12). Specifically, the configuration can be made such that the user, permitted to enter the particular area in entry permission table 308a, is permitted to use image forming apparatus MFP placed in the corresponding particular area. For example, "user A" and "user B" are permitted to enter "particular area AREA1" in entry permission table 308a shown in FIG. 6, and "MFP1" and "MFP2" are placed in "particular area AREA1" in location area table 356b shown in FIG. 12. Therefore, user management server MSV may refer to these tables to permit "user A" and "user B" who are permitted to enter "particular area AREA1" to use "MFP1" and "MFP2" which are placed in "particular area AREA1".

According to the first modification of the embodiment, on the basis of entry permission table 308a, entry control server DBS permits the user, permitted to enter the particular area, to use image forming apparatus MFP placed in the corresponding particular area. Therefore, because only entry permission table 308a stored in entry control server DBS is changed when a user is added or changed, the user management can be simplified.

A server (active directly) configured to be able to perform data communication with user management server MSV and entry control server DBS so that both the servers manage the user in an integrated manner may further be placed.

(Second Modification)

In the above embodiment, the power management of image forming apparatus MFP is performed based on the user presence state controlled by entry control server DBS. It is assumed that all the users permitted to use image forming apparatus MFP temporarily move to another place (for example, a meeting room). It is preferable to determine whether or not image forming apparatus MFP should make a transition to the lower power consumption mode after distinguishing such temporary leaving from going home of the user and the like.

Therefore, in a second modification of the embodiment, a configuration in which user management server MSV operates in conjunction with a groupware server which executes groupware will be illustrated.

Figure 17:
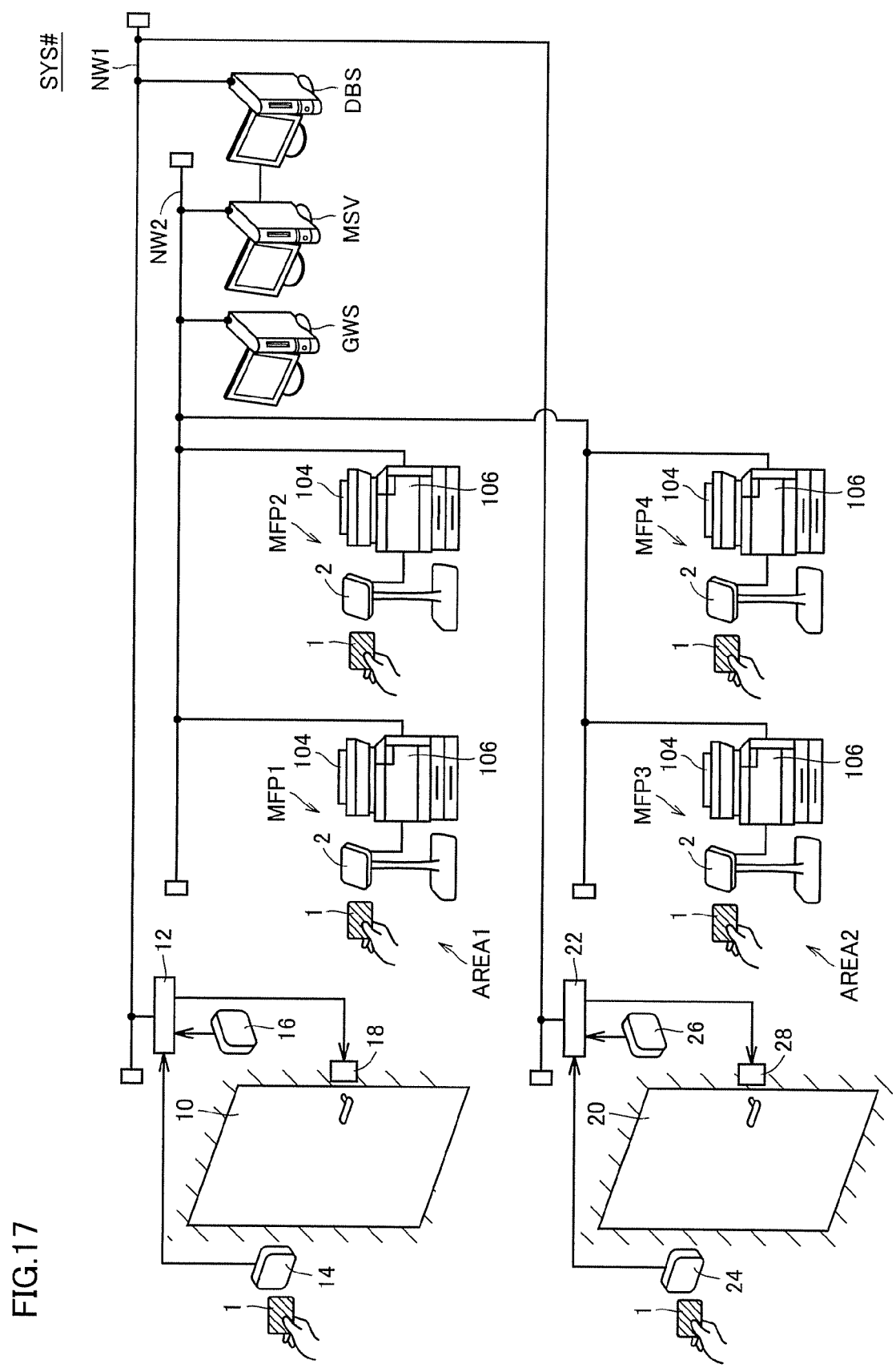
FIG. 17 shows a schematic configuration of a power management system according to a second modification of the embodiment of the present invention.

Referring to FIG. 17, in a power management system SYS# according to the second modification of the embodiment, a groupware server GWS is further placed in power management system SYS shown in FIG. 1.

Groupware server GWS is one which executes groupware. As used herein, the groupware shall mean software used to share information in an office or an organization. The groupware can perform a plurality of functions such as an electronic mail, an electronic bulletin board, a scheduler, and a workflow system. The groupware executed by groupware server GWS according to the second modification of the embodiment includes a function of retaining the location of each user inputted by each user. That is, each user can input the location such as "attended", "go home", "business trip", and "meeting", and other user can confirm the location of that user.

User management server MSV obtains the location of each user from groupware server GWS through network NW2, and determines whether or not target image forming apparatus MFP is required to make a transition to the lower power consumption mode based on the obtained location of each user. Even if all the users permitted to use target image forming apparatus MFP exist outside the corresponding particular area, user management server MSV does not provide the transition command to the lower power consumption mode unless the location of each user from groupware server GWS satisfies a predetermined condition. The predetermined condition includes, for example, a case of non-temporary leaving in which the locations of all the users permitted to use target image forming apparatus MFP are "go home" or "business trip".

A log-in state and the like of a personal computer used by each user may be adopted as a configuration except the configuration in which groupware server GWS is used.

According to the second modification of the embodiment, the existence of the user who is expected to use the image forming apparatus can be determined more accurately, so that the power management can be performed more properly for the image forming apparatus.

(Other Modifications)

A plurality of pieces of image forming apparatus MFPs are placed in the same particular area, and common users are permitted to use plurality of pieces of image forming apparatus MFPs. In such a case, part of plurality of pieces of image forming apparatus MFPs may sequentially be caused to make a transition to the lower power consumption mode according to the number of users existing in the particular area. For example, when half the users out of the total number of users permitted to use plurality of pieces of image forming apparatus MFPs leave the corresponding particular area, half of plurality of pieces of image forming apparatus MFPs may be caused to make a transition to the lower power consumption mode.

In the above embodiment, each piece of image forming apparatus MFP is automatically caused to make a transition to the lower power consumption mode when all the users permitted to use each piece of image forming apparatus MFP exist outside the corresponding particular area. Alternatively, a setting for disabling the transition to the lower power consumption mode may previously be configured.

In the above embodiment, target image forming apparatus MFP is immediately caused to make a transition to the lower power consumption mode when all the users, permitted to use image forming apparatus MFP, exist outside the corresponding particular area. Alternatively, image forming apparatus MFP may be caused to make a transition to the lower power consumption mode at a point in time where a predetermined period elapses (for example, 30 minutes) since all the users permitted to use image forming apparatus MFP leave the corresponding particular area.

In the programs executed by user management server MSV, entry control server DBS, and groupware server GWS respectively, a necessary module may be read and executed in a predetermined array at a predetermined timing from program modules provided as part of the operating system (OS) of the computer. In such a case, the module is not included in the program itself, and the process is performed in cooperation with the OS. The program which does not include the modules shall also be included in the program according to the present invention.

The program according to the present invention may be provided while incorporated in part of another program. In such a case, the module included in the another program is not included in the program, but the process is performed in cooperation with the another program. The program incorporated in the another program shall also be included in the program according to the present invention.

The provided program product is installed in a program storage unit such as a hard disk and executed. The program product includes the program itself and a storage medium in which the program is stored.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power management system comprising:
    an entry control apparatus for controlling a user's access to at least one particular area;
    an image forming apparatus placed in said particular area;
    a usage management apparatus for managing use permission of each user for said image forming apparatus, and
    a server apparatus for storing a location state of the each user input by the user, the location state indicating whether the user's leaving the at least one particular area is temporary, wherein
    said entry control apparatus includes:
        a first reader unit placed near an entrance of said particular area to read identification information of the user; and
        a state management unit to retain a presence state of each user in said particular area and to update said presence state of the user corresponding to said identification information read by said first reader unit,
    said image forming apparatus includes:
        a second reader unit to read said identification information of the user;
        an inquiry unit to inquire of said usage management apparatus for the use permission of the user corresponding to said identification information read by said second reader unit; and
        a manipulation enabling unit to enable acceptance of user manipulation when said usage management apparatus permits the user to use, and
    said usage management apparatus includes:
        a state obtaining unit to obtain said presence state of each user, permitted to use said image forming apparatus, from said entry control apparatus;
        a location obtaining unit to obtain, from said server apparatus, said location state of the each user; and
        a transition unit to cause said image forming apparatus to make a transition to a lower power consumption mode in which power consumption becomes less, when, with respect to all the users permitted to use said image forming apparatus, the obtained presence state indicates that all of the users exist outside said particular area and the obtained location state indicates that all of the users' leaving is not temporary.

2. The power management system according to claim 1, wherein
    said image forming apparatus is configured to be selectively installed a plurality of functions,
    said usage management apparatus further includes an installed state obtaining unit to obtain an installed state of the function in said image forming apparatus, and
    said transition unit selects one lower power consumption mode out of a plurality of said predetermined lower power consumption modes according to the installed state of the function in said image forming apparatus to cause said image forming apparatus to make a transition to the selected lower power consumption mode.

3. The power management system according to claim 1, wherein said transition unit causes said image forming apparatus to make a transition to said lower power consumption mode when a job in processing does not exist in said image forming apparatus.

4. The power management system according to claim 1, wherein said usage management apparatus further includes a returning unit to return said image forming apparatus to a normal operation mode from said lower power consumption mode when any one of the users, permitted to use said image forming apparatus, enters said particular area in the case where said image forming apparatus is in said lower power consumption mode.

5. The power management system according to claim 1, wherein
    said usage management apparatus is configured to be able to perform data communication with a server apparatus where a groupware runs,
    said server apparatus retains a location of each user, the location being inputted by each user, and
    said transition unit causes said image forming apparatus to make a transition to said lower power consumption mode when the locations of all the users permitted to use said image forming apparatus satisfy a predetermined condition based on the location of each user obtained from said server apparatus.

6. The power management system according to claim 1, wherein
    said entry control apparatus controls entry permission of each user into said particular area based on a predetermined data table, and
    said usage management apparatus permits, based on said predetermined data table, the user to use said image forming apparatus, the user being permitted to enter said particular area by said entry control apparatus.

7. The power management system according to claim 1, wherein
said entry control apparatus controls the user's access to the respective particular areas, and
said usage management apparatus manages the use permission of each user for the respective image forming apparatuses.

8. A method for power management using a system including an image forming apparatus,
said system including an entry control apparatus for controlling user's access to at least one particular area, said image forming apparatus placed in said particular area, a usage management apparatus for managing use permission of each user for said image forming apparatus, and a server apparatus for storing a location of the each user input by the user, the location state indicating whether the user's leaving the at least one particular area is temporary,
said entry control apparatus including a first reader unit placed near an entrance of said particular area to read identification information of the user, and a state management unit to retain a presence state of each user in said particular area and to update said presence state of the user corresponding to said identification information read by said first reader unit,
said image forming apparatus including a second reader unit to read said identification information of the user,
the method for power management comprising the steps of:
inquiring of said usage management apparatus for the use permission of the user corresponding to said identification information read by said second reader unit;
enabling the user to manipulate said image forming apparatus when said usage management apparatus permits the user to use;
obtaining said presence state of each user, permitted to use said image forming apparatus, from said entry control apparatus;
obtaining the location state from the server apparatus; and
causing said image forming apparatus to make a transition to a lower power consumption mode in which power consumption becomes less, when all the users permitted to use said image forming apparatus exist outside said particular area and the location state of all the users indicates that all of the users' leaving is not temporary.

9. The method for power management according to claim 8, wherein
said image forming apparatus is configured to be selectively installed a plurality of functions,
said method for power management further comprises the step of obtaining an installed state of the function in said image forming apparatus, and
said step of causing said image forming apparatus to make a transition to said lower power consumption mode includes the step of selecting one lower power consumption mode out of a plurality of said predetermined lower power consumption modes according to the installed state of the function in said image forming apparatus to cause said image forming apparatus to make a transition to the selected lower power consumption mode.

10. The method for power management according to claim 8, wherein said step of causing said image forming apparatus to make a transition to said lower power consumption mode includes the step of causing said image forming apparatus to make a transition to said lower power consumption mode when a job in processing does not exist in said image forming apparatus.

11. The method for power management according to claim 8, further comprising the step of returning said image forming apparatus to a normal operation mode from said lower power consumption mode when any one of the users permitted to use said image forming apparatus enters said particular area in the case where said image forming apparatus is in said lower power consumption mode.

12. The method for power management according to claim 8, wherein said system further includes a server apparatus where a groupware runs,
said server apparatus retains a location of each user, the location being inputted by each user, and
said step of causing said image forming apparatus to make a transition to said lower power consumption mode includes the step of causing said image forming apparatus to make a transition to said lower power consumption mode when the locations of all the users permitted to use said image forming apparatus satisfy a predetermined condition based on the location of each user obtained from said server apparatus.

13. A usage management apparatus of an image forming apparatus, wherein said usage management apparatus is configured to be able to perform data communication with an entry control apparatus for controlling user's access to at least one particular area, said image forming apparatus placed in said particular area, and a server apparatus;
said entry control apparatus includes:
a first reader unit placed near an entrance of said particular area to read identification information of the user; and
a state management unit to retain a presence state of each user for said particular area and to update said presence state of the user corresponding to said identification information read by said first reader unit,
said image forming apparatus includes:
a second reader unit to read said identification information of the user;
an inquiry unit to inquire of said usage management apparatus for the use permission of the user corresponding to said identification information read by said second reader unit; and
a manipulation enabling unit to enable acceptance of user manipulation when said usage management apparatus permits the user to use,
said server apparatus comprises a storage unit for storing a location state of the each user input by the user, the location state indicating whether the user's leaving the at least one particular area is temporary;
said usage management apparatus comprises:
a state obtaining unit to obtain said presence state of each user, permitted to use said image forming apparatus, from said entry control apparatus; and
a transition unit to cause said image forming apparatus to make a transition to a lower power consumption mode in which power consumption becomes less, when all the users permitted to use said image forming apparatus exist outside said particular area and the location state of all the users indicates that all of the users' leaving is not temporary.

* * * * *